United States Patent
Annapragada

(10) Patent No.: US 10,725,771 B2
(45) Date of Patent: Jul. 28, 2020

(54) ARTIFACT TRANSFORMATION IN NETWORK DEVICES

(71) Applicant: Verizon Patent and Licensing Inc., Arlington, VA (US)

(72) Inventor: Mrithyunjaya Annapragada, Bolton, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 227 days.

(21) Appl. No.: 15/900,866

(22) Filed: Feb. 21, 2018

(65) Prior Publication Data
US 2019/0258499 A1 Aug. 22, 2019

(51) Int. Cl.
*G06F 8/658* (2018.01)
*G06F 9/455* (2018.01)
*G06F 16/901* (2019.01)
*G06F 16/903* (2019.01)
*H04L 29/08* (2006.01)

(52) U.S. Cl.
CPC .......... *G06F 8/658* (2018.02); *G06F 9/45541* (2013.01); *G06F 9/45558* (2013.01); *G06F 16/9024* (2019.01); *G06F 16/90335* (2019.01); *G06F 2009/45562* (2013.01); *G06F 2009/45595* (2013.01); *H04L 67/10* (2013.01)

(58) Field of Classification Search
CPC ............. G06F 9/45558; G06F 9/45541; G06F 16/90335; G06F 16/9024; G06F 2009/45562; G06F 2009/45595; G06F 8/658; H04L 67/10
See application file for complete search history.

(56) References Cited

U.S. PATENT DOCUMENTS

| | | | | |
|---|---|---|---|---|
| 8,341,113 | B2 * | 12/2012 | Meller | H03M 7/30 707/609 |
| 9,465,518 | B1 * | 10/2016 | Koryakina | G06F 16/128 |
| 2017/0090902 | A1 * | 3/2017 | Bainville | G06F 8/71 |
| 2017/0242725 | A1 * | 8/2017 | Roth | G06F 9/45533 |
| 2018/0081891 | A1 * | 3/2018 | Alberti | G06F 16/128 |

OTHER PUBLICATIONS

S. Echeverria, et al.: "On-Demand VM Provisioning for Cloudlet-Based Cyber-Foraging in Resource-Constrained Environments". 2014, 18 pages.
G. A. Lewis: "Cloudlet-Based Cyber-Foraging for Mobile Systems in Resource-Constrained Edge Environments". 2014, 4 pages.

* cited by examiner

*Primary Examiner* — Jacob D Dascomb

(57) ABSTRACT

A device receives a request for a second artifact, where the request identifies a first artifact that is different than the second artifact. The device obtains at least one transformation for transforming the first artifact into the second artifact, and uses the obtained at least one transformation to transform the first artifact into the second artifact. The device launches or instantiate a compute resource or a logical disk volume using the second artifact, where the compute resource includes one of a virtual machine, a baremetal, or a container. The first artifact and the second artifact each includes an image or a snapshot.

20 Claims, 22 Drawing Sheets

ARTIFACT TRANSFORMATION IN NETWORK DEVICES

BACKGROUND

In cloud computing environments, virtual machines are typically launched from "images" which are serialized representations of virtual machine state. Requests to instantiate a new virtual machine specify an image via a tracking identifier. Clouds maintain repositories of images to satisfy these requests. Images are often large files, with sizes ranging from the high 100's of megabytes (MBs) to gigabytes (GBs). Images are stored in formats like Quick Emulator (QEMU) Copy-on-Write (QCOW or QCOW2), RAW, TAR, Amazon Machine Image (AMI), Virtual Hard Disk (VHD) (Microsoft HyperV specific), or VMX (VMWare specific). Different platforms support different formats of images but use the different image formats to perform the same function, which is to launch or instantiate a "compute resource." An "image" includes information that is used to create or instantiate a virtual machine (VM), a baremetal, a container, an emulator, or a zone.

A VM includes an operating system (OS) or application that is executed in the context of software called a hypervisor. A hypervisor emulates (virtualizes) dedicated hardware. A hypervisor executes on a computer and receives a request to launch a virtual machine. The request includes a pointer (e.g., a path name) to an image that is to be used. The hypervisor retrieves the image, creates a volume from the contents of the image, and then launches a controlled execution environment which executes a bootloader stored on the volume created. The VM executes under the control of the hypervisor, and many virtual machines can be executed on a single physical machine. Each VM typically has its own copy of the operating system and all components required to run the operating system and the applications therein.

A baremetal includes a physical machine that is provisioned using some suitable image. One way in which this can be accomplished is through a bootstrapping mechanism (e.g., BOOTP) where a physical machine boots into a primitive program (e.g., BIOS), which then looks on a network for a BOOTP server. If found, the BOOTP server provides the BIOS program with information that is used to fetch an image (e.g., a location IP and image identifier). The BOOTP server retrieves the image, writes it to a disk, and then transfers control to the bootloader that has been written to the disk.

A container is similar to a VM in that it is not a physical machine. However, unlike a VM, a container typically does not contain a complete operating system. Many containers can run on a physical machine or a virtual machine, and all of them share the operating system image with the physical or virtual machine. Each container has a private copy of the application or components that is being run in the container.

In certain computing scenarios, a logical disk volume is instantiated from a "volume image," which is a serialized representation of the state of a logical disk volume. Requests to instantiate a new volume specify the volume image. These volume images are sometimes referred to as "snapshots" and are often gigabytes, terabytes, or even petabytes in size. Clouds maintain repositories of snapshots to satisfy these requests. A snapshot of an object includes a representation of the state of the object at a specific point in time, with sufficient information available to be able to, at a subsequent time, create an identical copy of the object at the time of the snapshot. For example, a computer may store data on a number of disk drives which are accessible by an application running on that computer as a "logical volume." A snapshot of the logical volume is a representation of the state of that logical volume such that a clone of the logical volume can be created at some point in the future. One implementation of a snapshot includes a complete copy of every object on the logical volume and the hierarchical directory structure. In other implementations, a snapshot may include state, configuration, and/or timestamp information that is used to instantiate a logical disk volume.

An "artifact," as referred to herein, includes any type of image, snapshot, or other serialized representation of state (e.g., operating system state, data files, and/or applications), and/or configuration information, that may be used as a template for creating or instantiating a compute resource (e.g., a VM, a baremetal, a container), a logical disk volume, or other serialized representation of state.

DETAILED DESCRIPTION OF THE PREFERRED EMBODIMENTS

Figure 1:
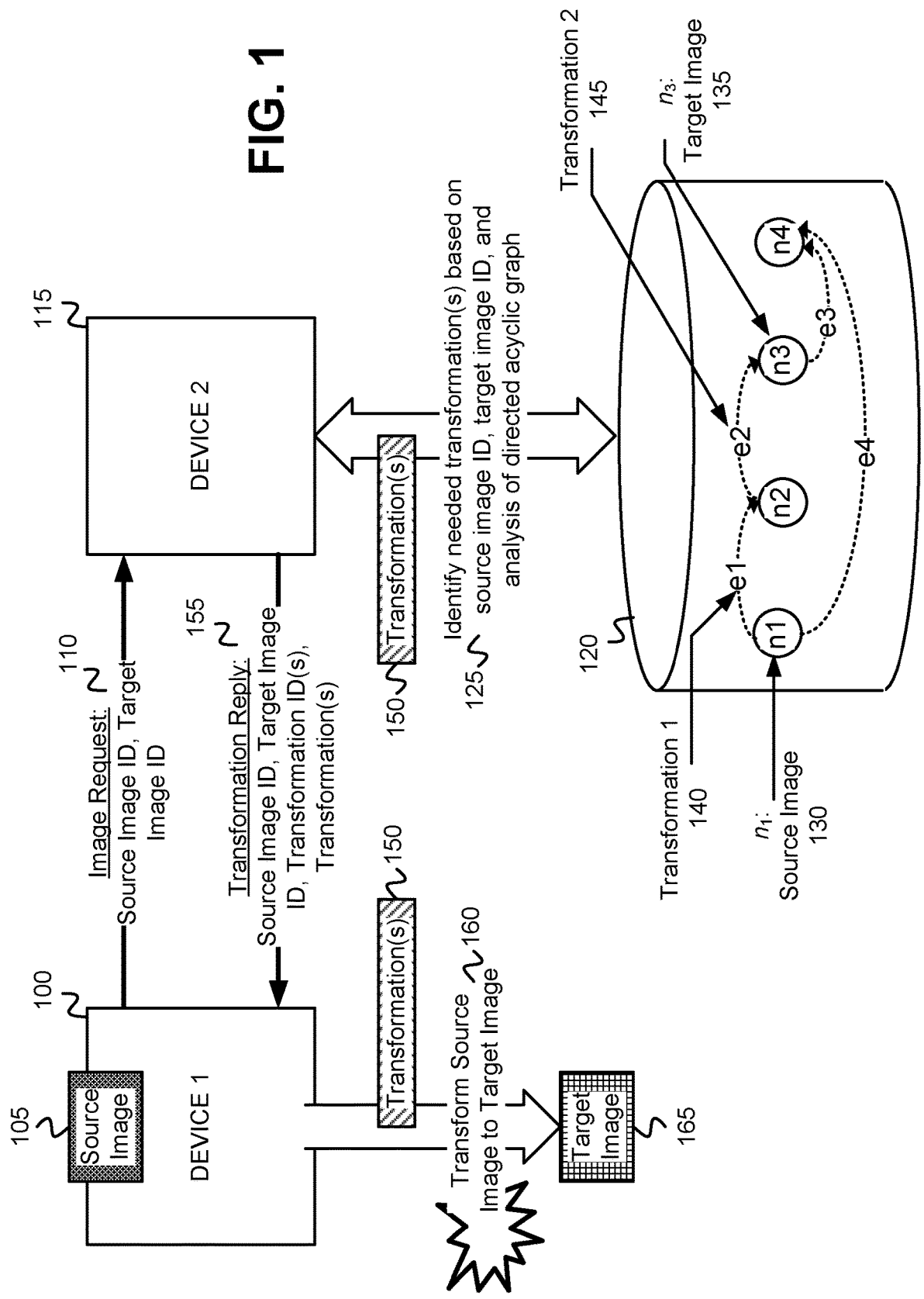
FIG. 1 depicts an overview of the synthesis of artifacts, based on the use of one or more artifact transformations, according to an exemplary embodiment.

The following detailed description refers to the accompanying drawings. The same reference numbers in different drawings may identify the same or similar elements. The following detailed description does not limit the invention.

In distributed edge computing systems, large numbers of devices (e.g., tens of thousands, hundreds of thousands, or millions) provide the infrastructure in which compute resources and logical disk volumes may be instantiated. Edge computing devices, in contrast with traditional data center equipment, have very limited compute and storage resources available to them and, therefore, it is important that edge computing device image and snapshot repositories be able to represent the images and snapshots in optimized ways. Edge computing devices are often used in conjunction with mobile devices that connect to the edge computing devices to obtain one or more services from the edge computing devices, and then disconnect and connect to other edge computing devices as the mobile devices roam.

In a circumstance where a mobile device (e.g., a mobile telephone) requires a specific network function or service being provided by an edge computing device, the mobile devices sends a request to the edge computing device, and, in response, the edge computing device launches a specific service that runs in a virtual machine, or other compute resource. In order to launch the requested compute resource, the edge computing device needs to identify a suitable artifact that can be launched. In a diverse network, with hundreds of thousands of edge computing devices, applications, and possible artifacts (e.g., images, snapshots), it is not feasible for every edge computing device to have a copy of every possible artifact. In contemporary systems, mechanisms for artifact distribution follow hierarchical and centralized models with some central service communicating all valid images to all parts of the distributed edge computing system. This is an enormously costly activity that involves the transmission of huge amounts of data and requires that a given artifact be centrally propagated to the entire system before the artifact can be used, and then that artifact must be stored at all edge computing locations.

In embodiments described herein, when a particular node or device attempts to launch a given compute resource (e.g., VM, baremetal, container) or logical disk volume, and the corresponding target artifact for the compute resource or logical disk volume is not stored locally, the node or device can request the target artifact from another node or device. The other node or device, upon receiving the request for the target artifact, may retrieve an appropriate transformation and send the transformation, instead of the requested target artifact, to the requesting node or device. The "transformation," as referred to herein, facilitates the synthesis of an image or snapshot by transforming an existing artifact into a desired artifact. A transformation includes a data unit, that further includes data and/or instructions, that permits a source artifact to be transformed into a different, target artifact. In one exemplary implementation, a given transformation includes a transformation data unit that details a binary difference between the source artifact and the target artifact. The binary difference specified by the transformation data unit encodes a bit-by-bit difference between the source artifact and the target artifact. In some implementations, a sequence of multiple transformations may be used to transform a given source artifact into a desired artifact. Communication of a transformation data unit(s), instead of an entire artifact, reduces bandwidth demands upon the network (i.e., network cost), and improves the speed at which the compute resource can be launched at a node or device.

FIG. 1 depicts an overview of the synthesis of artifacts based on the use of one or more artifact transformations according to an exemplary embodiment. Artifact transformations, as described herein, may be used for transforming a source artifact to a desired target artifact without the need for transmitting the entire target artifact to a device across a network and requiring a high demand upon the available bandwidth of the network transporting the target artifact. The exemplary artifact synthesis process shown in FIG. 1 is described with respect to obtaining a desired target image. However, the artifact synthesis process depicted in FIG. 1 is applicable to artifacts generally, and to any type of artifact that may be used for creating or instantiating a compute resource or logical disk volume, such as, for example, a snapshot, or other serialized representation of state.

As shown in FIG. 1, a first device (device 1) 100 attempts to retrieve a desired target image from memory and determines that the desired target image is not stored locally, but that another image, called a "source image" 105, is stored locally. The first device 100 then formulates an image request 110 that includes an identifier (ID) of the locally stored source image, and an ID for the desired target image, and sends the image request 110 to a second device (device 2) 115.

Upon receipt of image request 110, the second device 115 searches a database (DB) 120 to identify 125 one or more transformations that specify how to transform source image 105 into the desired target image. In one exemplary implementation, as shown in FIG. 1, the DB 120 may store one or more directed acyclic graphs that detail a sequence of images, and the transformation that transforms each image in the sequence into a next image in the sequence. In the example depicted in FIG. 1, the directed acyclic graph includes four nodes $n_1$, $n_2$, $n_3$, and $n_4$, with an edge connecting each node to another node. Each node $n_x$ represents an image, and each edge $e_x$, represents a transformation (a transformation data unit). Therefore, as shown in FIG. 1, edge $e_1$ represents a transformation that transforms the image corresponding to node $n_1$ to an image corresponding to node $n_2$, edge $e_2$ represents a transformation that transforms the image corresponding to node $n_2$ to an image corresponding to node $n_3$, edge $e_3$ represents a transformation that transforms the image corresponding to node $n_3$ to an image corresponding to node $n_4$, and edge $e_4$ represents a transformation that transforms the image corresponding to node $n_1$ to an image corresponding to node $n_4$. In the particular example depicted in FIG. 1, node $n_1$ 130 corresponds to source image 105, and node $n_3$ 135 corresponds to the desired target image.

A search of the directed acyclic graph stored in DB 120 identifies edge $e_1$, corresponding to the first transformation data unit 140, for transforming the source image 130 to an intermediate image corresponding to node $n_2$. The search of the directed acyclic graph stored in DB 120 further identifies edge $e_2$, corresponding to the second transformation data unit 145, for transforming the image corresponding to node $n_2$, to the desired target image corresponding to node $n_3$ 135. The search of the directed acyclic graph stored in DB 120, in the example shown in FIG. 1, results in retrieval of a first transformation data unit 140, and a second transformation data unit 145, for transforming source image 105 to the desired target image 135. The second device 115 obtains the one or more transformation data units 150 (transformation data units 140 and 145, in the example shown), and formulates a transformation reply 155 that includes, for example, a source image ID, a target image ID, an ID of each of the retrieved one or more transformations, and the one or more transformations 150. The second device 115 sends the transformation reply 155 to the first device 100.

Upon receipt of the transformation reply 155 from the second device 115, the first device 100 retrieves the one or more transformation data units 150 from the transformation reply 155 and performs a process that transforms 160 the source image 105 into a desired target image 165 using the one or more transformation data units 150. Referring to the example depicted in FIG. 1, the first device 100 transforms source image 105 to a second image using a first transformation data unit 140, and then transforms that second image into a third image that represents the desired target image 165 using the second transformation data unit 145.

Subsequent to generating the desired target image 165, the first device 100 may store the target image 165 locally (in conjunction with the one or more transformation data units) and/or send the target image 165 to another node or device.

Figure 2:
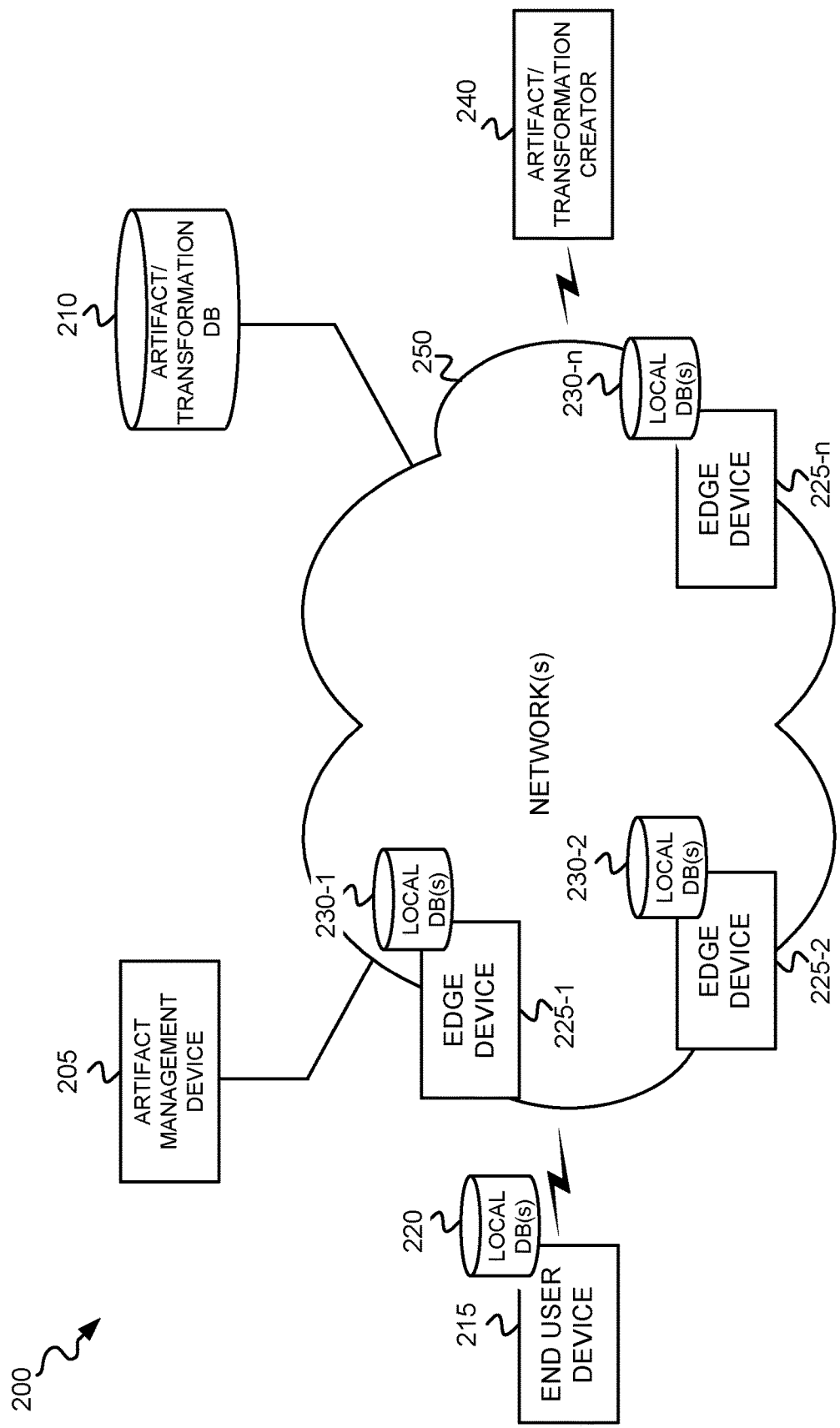
FIG. 2 depicts an exemplary network environment in which artifacts may be synthesized using transformations.

FIG. 2 depicts an exemplary network environment 200 in which artifacts may be synthesized using transformations, as described herein. Network environment 200 includes an artifact management device 205, an artifact/transformation DB 210, an end user device 215, a local DB(s) 220, edge devices 225-1 through 225-$n$ and respective local DB(s) 230-1 through 230-$n$, an artifact/transformation creator 240, and a network(s) 250.

Artifact management device 205 includes one or more network devices that may manage the storage of artifacts and/or transformations in DB 210 and may manage the distribution of the stored artifacts and/or transformations to edge devices 225 or end user device 215.

Artifact/transformation DB 210 includes one or more network devices that include a memory device(s) that stores artifacts and/or transformations, as managed by artifact management device 205. In some implementations, DB 210 may include a centralized storage location for maintaining a centralized location for storing, and retrieving, artifacts and/or transformations. DB 210 may store data structures, such as the data structures described below in FIGS. 4-7.

End user device 215 may include any type of device that communicates over network(s) 250 via a wired or wireless connection. For example, end user device 215 may include a mobile telephone (e.g., a smart phone), a personal digital assistant (PDA), a machine-to-machine (M2M) or Internet of Things (IoT) device, or a computer (e.g., laptop, tablet, palmtop or wearable computer). A user (not shown) may be associated with end user device 215, where the user may include a permanent or temporary owner, operator, or administrator of the end user device 215. In some implementations, end user device 215 may connect with an edge device 225 to request the provisioning of a particular service. DB(s) 220 includes a data storage element or device that may be locally accessed by end user device 215. For example, in one implementation, the data storage element or device may include an internal memory device of end user device 215. In another implementation, the data storage element or device may include an external memory device that is locally accessible via a wired or wireless connection from end user device 215 (e.g., an external memory drive). DB 220 may store data structures, such as the data structures described below in FIGS. 4-7, however, the data structures stored in DB 220 may include only a limited subset of the artifacts and/or transformations stored in artifact/transformation DB 210.

Edge devices 225-1 through 225-$n$ may each include a network device that may execute particular services requested by end user device 215, and which may further cache or store data applications (apps), artifacts and/or artifact transformations within a respective DB 230. DB(s) 230-1 through 230-$n$ each includes a data storage element or device that may be locally accessed by a respective edge device 225. For example, in one implementation, the data storage element or device may include an internal memory device of edge device 225. In another implementation, the data storage element or device may include an external memory device that is locally accessible via a wired or wireless connection from edge device 225 (e.g., an external memory drive). DB 230 may store data structures, such as the data structures described below with respect to FIGS. 4-7, however, the data structures stored in DB 230 may include only a limited subset of the artifacts and/or transformations stored in artifact/transformation DB 210.

Artifact/transformation creator 240 includes a network device that creates or generates artifacts and/or transformations and uploads the artifacts and/or transformations to artifact management device 205 for storage in artifact/transformation DB 210.

Network(s) 250 may include one or more wired or wireless networks of various types including, for example, a telecommunications network (e.g., Public Switched Telephone Networks (PSTNs)), one or more wireless networks (e.g., a Public Land Mobile Network(s) (PLMN(s)), a satellite network(s)), the Internet, a wired and/or wireless local area network (LAN), a wired and/or wireless wide area network (WAN), a metropolitan area network (MAN), an intranet, or a cable network (e.g., an optical cable network).

The configuration of network components of network environment 200 is shown in FIG. 2 is for illustrative purposes. Other configurations may be implemented. Therefore, network environment 200 may include additional, fewer and/or different components that may be configured in a different arrangement than that depicted in FIG. 2. For example, though network environment is depicted as including a single end user device 215 and a single artifact/transformation creator 240, network environment 200 may include numerous end user devices 215 and numerous artifact/transformation creators 240. The numerous end user devices 215 may communicate with different ones of edge devices 225 (e.g., depending on geographic location and/or network proximity) to request particular services, artifacts, and/or transformations.

Figure 3:
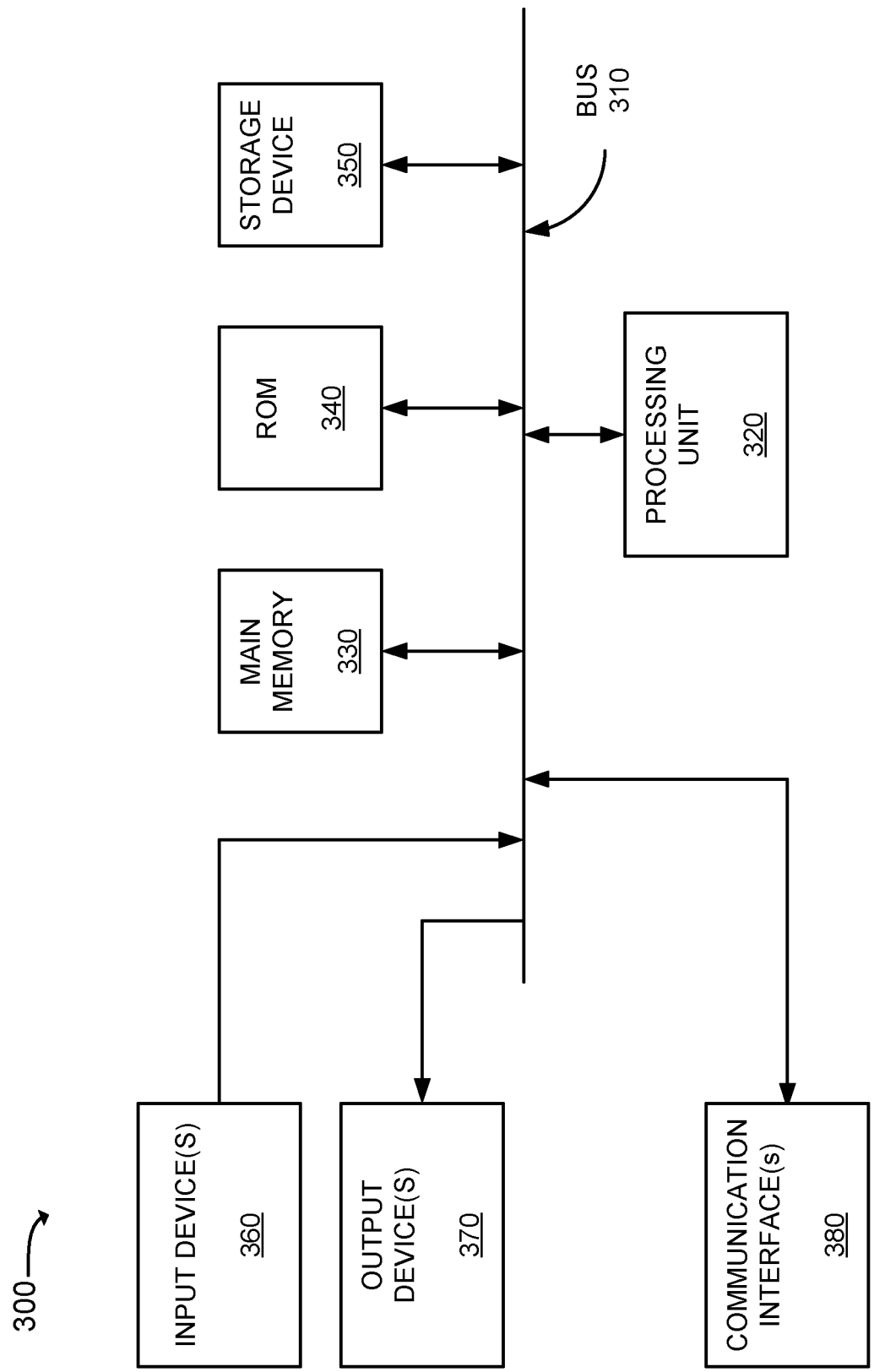
FIG. 3 is a diagram that depicts exemplary components of a device that may correspond to the artifact management device, artifact/transformation database, end user devices, databases, edge devices, and/or artifact/transformation creator of FIG. 2.

FIG. 3 is a diagram that depicts exemplary components of a device 300. Artifact management device 205, artifact/transformation DB 210, end user device 215, DB(s) 220, DB(s) 230-1 through 230-$n$, edge devices 225-1 through 225-$n$, and artifact/transformation creator 240 may be configured the same as, or similar to, device 300, but possibly with some variations in components or configuration. Device 300 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of device 300.

Processing unit 320 may include one or more processors or microprocessors which may interpret and execute stored instructions associated with one or more processes, or processing logic that implements the one or more processes. For example, processing unit 320 may include, but is not limited to, programmable logic such as Field Programmable Gate Arrays (FPGAs) or accelerators. Processing unit 320 may include software, hardware, or a combination of software and hardware for executing the processes described herein. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium." The process/methods set forth herein can be implemented as instructions that are stored in main memory 330, ROM 340 and/or storage device 350 for execution by processing unit 320.

Input device 360 may include one or more mechanisms that permit an operator to input information into device 300, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include a transceiver that enables device 300 to communicate with other devices and/or systems. For example, communication interface(s) 380 may include a wireless transceiver(s), and associated antenna(s), for communicating via network(s) 250. As another example, communication interface(s) 380 may include a wired transceiver(s) for communicating via network(s) 250.

The configuration of components of device 300 illustrated in FIG. 3 is for illustrative purposes. Other configurations may be implemented. Therefore, device 300 may include additional, fewer and/or different components than those depicted in FIG. 3.

Figure 4:
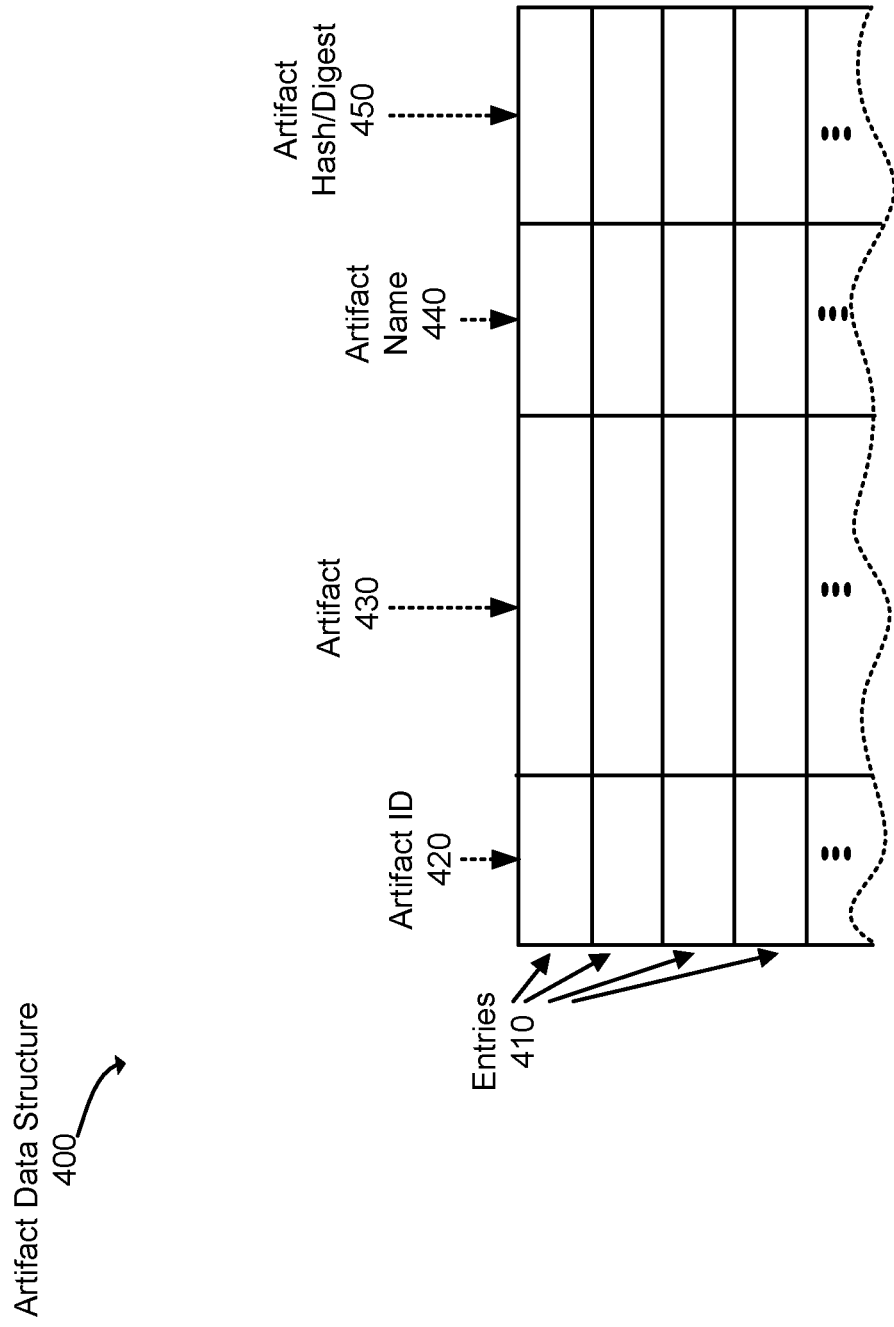
FIG. 4 is a diagram that depicts an exemplary implementation of an artifact data structure that may be stored in a database.

FIG. 4 is a diagram that depicts an exemplary implementation of an artifact data structure 400 that may be stored in a DB, such as, DB 210, DB(s) 220, and/or DB(s) 230. As shown, the artifact data structure 400 may include multiple entries 410, and each entry 410 may include an artifact ID field 420, an artifact field 430, an artifact name field 440, and an artifact hash/digest field 450.

Artifact ID field 420 stores a unique identifier (ID) associated with an artifact stored in field 430. In some implementations, the unique ID may include a universally unique ID (UUID). Artifact field 430 stores the artifact associated with the unique ID in field 420 of entry 410. Artifact name field 440 stores data identifying a name for the artifact stored in field 430 of entry 410. The name may include an alphanumeric, or textual, name associated with the artifact stored in field 430. Artifact hash/digest field 450 stores data that includes a hash or digest of the artifact stored in field 430 of entry 410. The hash or digest may be generated using, for example, any type of algorithm (e.g., a hash function) that maps data of an arbitrary size to data of a fixed size. The hash or digest may be used as a unique ID for the artifact, or may be used for other purposes (e.g., artifact error detection).

To locate a particular entry 410, data structure 400 may be queried with, for example, an artifact ID to locate an entry 410 having a matching artifact ID stored in field 420. When such an entry 410 is located, data may be stored in one or more fields 420, 430, 440, and/or 450 of the entry 410, or data may be retrieved from one or more of fields 420, 430, 440, and/or 450 of the entry 410. Other fields of an entry 410, instead of artifact ID field 420, may be used for querying data structure 400, such as, for example, artifact name field 440, or artifact hash/digest field 450.

Figure 5:
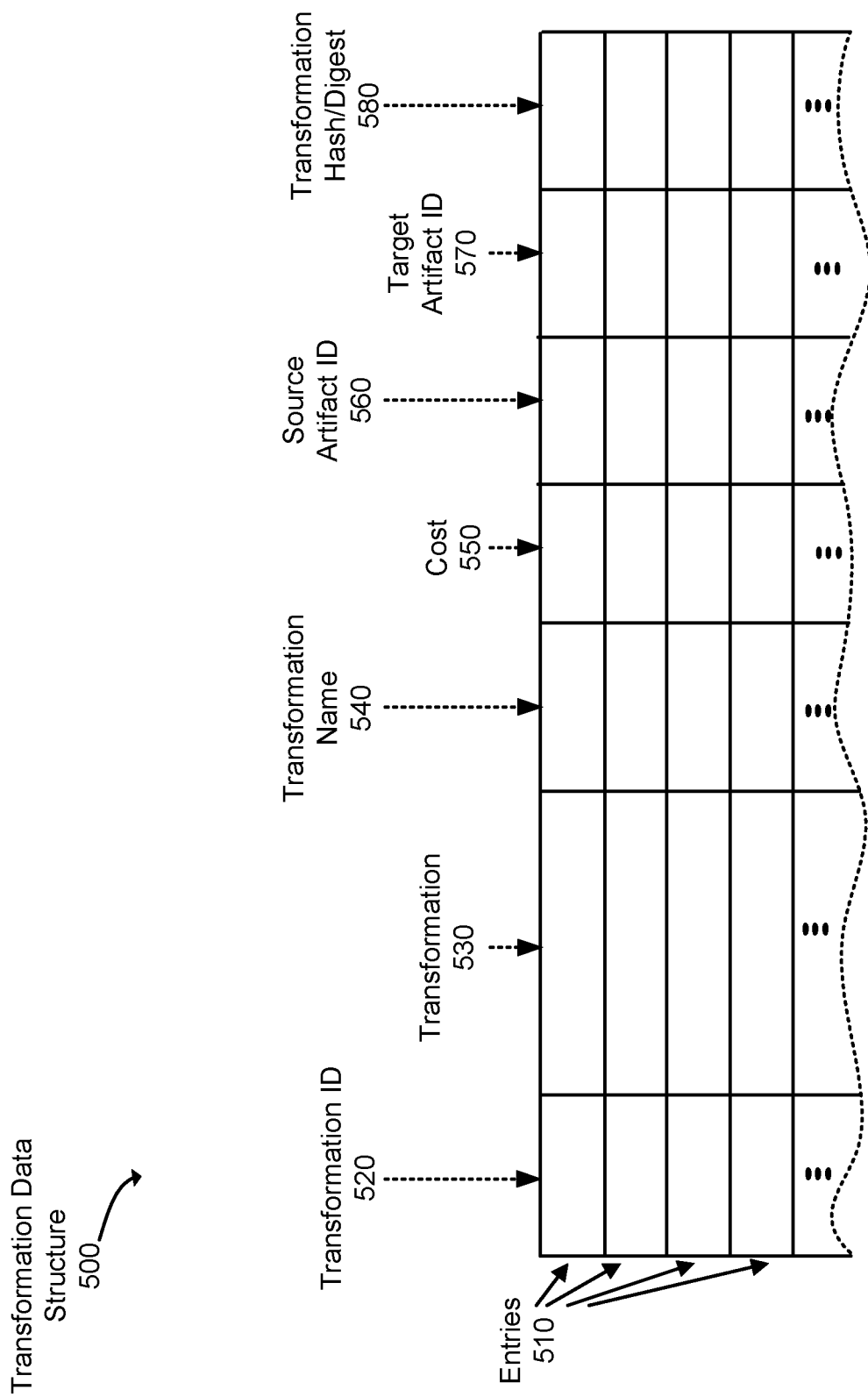
FIG. 5 is a diagram that depicts an exemplary implementation of a transformation data structure that may be stored in a database.

FIG. 5 is a diagram that depicts an exemplary implementation of a transformation data structure 500 that may be stored in a DB, such as, DB 210, DB(s) 220, and/or DB(s) 230. As shown, the transformation data structure 500 may include multiple entries 510, and each entry 510 may include a transformation ID field 520, a transformation field 530, a transformation name field 540, a cost field 550, a source artifact ID field, a target artifact ID field 570, and a transformation hash/digest field 580.

Transformation ID field 520 stores a unique identifier associated with the transformation stored in field 530 of entry 510. In some implementations, the unique identifier may include a UUID. Transformation field 530 stores the transformation identified in field 520 of entry 510. In some implementations, the stored transformation may include a transformation data unit that further includes data that can be used to transform a particular source artifact, identified in field 560 of entry 510, to a particular target artifact, identified in field 570. Transformation name field 540 stores data identifying a name for the transformation stored in field 530 of entry 510. The name may include an alphanumeric, or textual, name associated with the transformation stored in field 530.

Cost field 550 stores data that indicates a cost associated with using the transformation identified in field 520 of entry 510 for transforming the source artifact, identified in field 560, to the target artifact, identified in field 570. The cost may represent a cost in memory usage, processor usage (e.g., processor time), or a cost associated with other parameters. Source artifact ID field 560 stores a unique ID for an artifact that the transformation, identified in field 520 of entry 510, can transform into the artifact identified in field 570. The source artifact ID stored in field 560 corresponds to a particular artifact ID stored in field 420 of artifact data structure 400. Target artifact ID field 570 stores a unique ID for an artifact that the transformation, identified in field 520 of entry 510, transforms into from the source artifact identified in field 560. The target artifact ID stored in field 570 also corresponds to a particular artifact ID stored in field 420 of artifact data structure 400.

Transformation hash/digest field 580 stores data that includes a hash or digest of the transformation stored in field 530 of entry 510. The hash or digest may be generated using, for example, any type of algorithm (e.g., a hash function) that maps data of an arbitrary size to data of a fixed size. The hash or digest may be used as a unique ID for the transformation, or may be used for other purposes (e.g., transformation error detection).

To locate a particular entry 510, data structure 500 may be queried with, for example, a transformation ID to locate an entry 510 having a matching transformation ID stored in field 520. When such an entry 510 is located, data may be stored in one or more fields 520, 530, 540, 550, 560, 570, and/or 580 of the entry 510, or data may be retrieved from one or more of fields 520, 530, 540, 550, 560, 570, and/or 580 of the entry 510. Other fields of an entry 510, instead of transformation ID field 520, may be used for querying data structure 500, such as, for example, transformation name field 540, source artifact ID field 560, or target artifact ID field 570.

Figure 6:
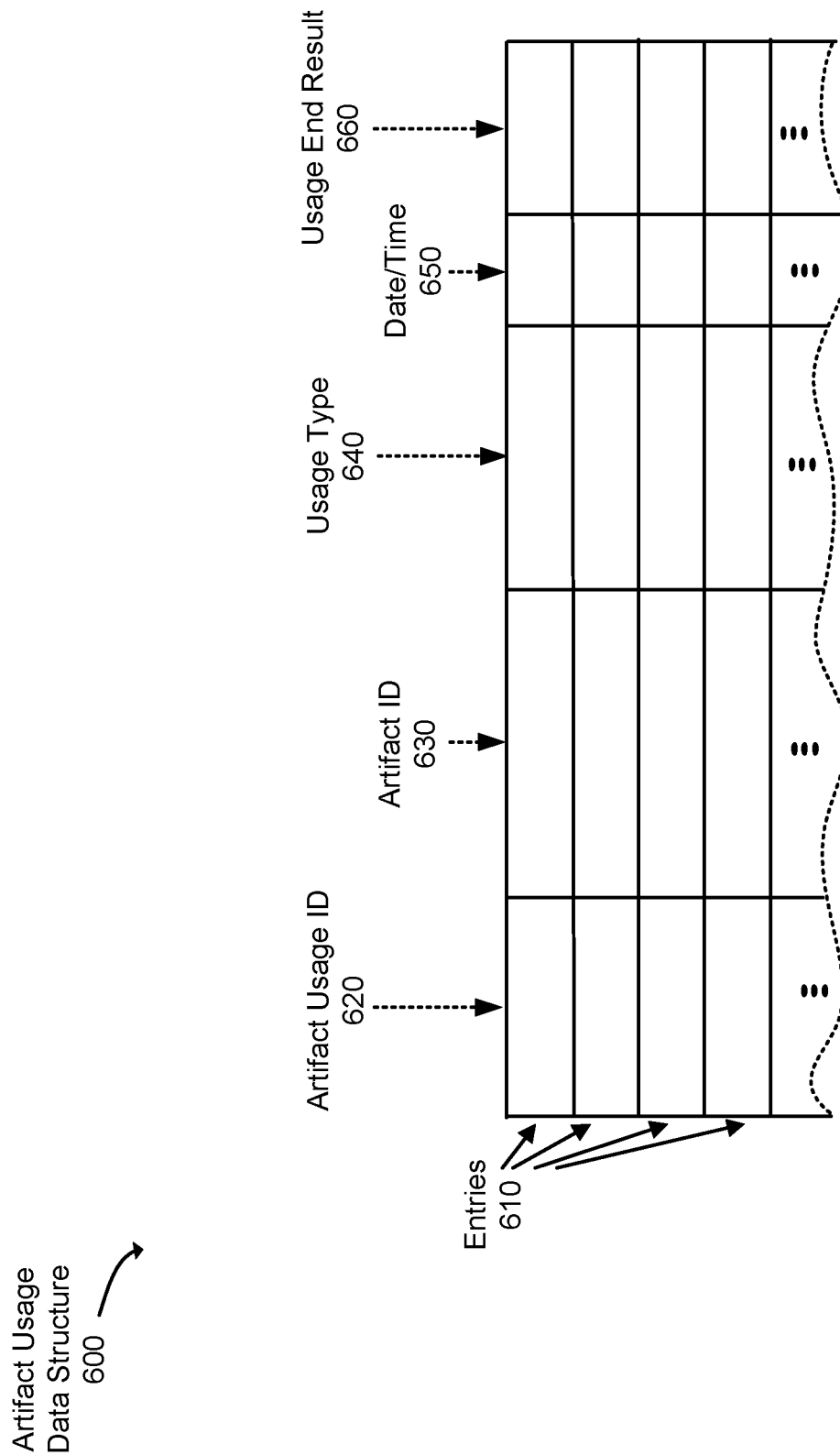
FIG. 6 is a diagram that depicts an exemplary implementation of an artifact usage data structure that may be stored in a database.

FIG. 6 is a diagram that depicts an exemplary implementation of an artifact usage data structure 600 that may be stored in a DB, such as, DB 210, DB(s) 220, and/or DB(s) 230. As shown, the artifact usage data structure 600 may include multiple entries 610, and each entry 610 may include an artifact usage ID field 620, an artifact ID field 630, a usage type field 640, a date/time field 650, and a usage end result field 660.

Artifact Usage ID field 620 stores a unique ID for a particular artifact usage associated with the invocation or request of the artifact identified in field 630. Artifact ID field 630 stores a unique identifier (ID) associated with a particular artifact being used for a particular purpose. In some implementations, the unique ID may include a UUID. The artifact ID stored in field 630 also corresponds to a particular artifact ID stored in field 420 of artifact data structure 400. Usage type field 640 stores data indicating a usage of the artifact identified in field 630 of entry 610. The artifact identified in field 630 may be invoked or requested for a particular type of use, and that type of use for the particular instance of usage may be identified and stored in usage type field 640. In one implementation, two different usage types may be indicated in field 640, a direct usage type and an indirect usage type. The direct usage type indicates that the artifact identified in field 630 is stored locally, and may be directly retrieved, without having to obtain the artifact through the use of one or more transformations. The indirect usage type indicates that the artifact identified in field 630 is not stored locally, but may be obtained indirectly through the use of one or more transformations. Date/time field 650 stores data indicating a date and/or time associated with the usage of the artifact identified in field 630 of entry 610. A current date and/or time associated with the particular instance of usage may be stored in field 650. Usage end result field 660 stores data indicating an end result of the artifact usage identified in field 620 of entry 610. If the particular usage is an artifact transformation, the end result may include, for example, an identifier of a transformed target artifact.

To locate a particular entry 610, data structure 600 may be queried with, for example, an artifact usage ID to locate an entry 610 having a matching artifact usage ID stored in field 620. When such an entry 610 is located, data may be stored in one or more fields 620, 630, 640, 650, and/or 660 of the entry 610, or data may be retrieved from one or more of fields 620, 630, 640, 650 and/or 660 of the entry 610. Other fields of an entry 610, instead of artifact usage ID field 620, may be used for querying data structure 600, such as, for example, artifact ID field 630, usage type field 640 or date/time field 650.

Figure 7:
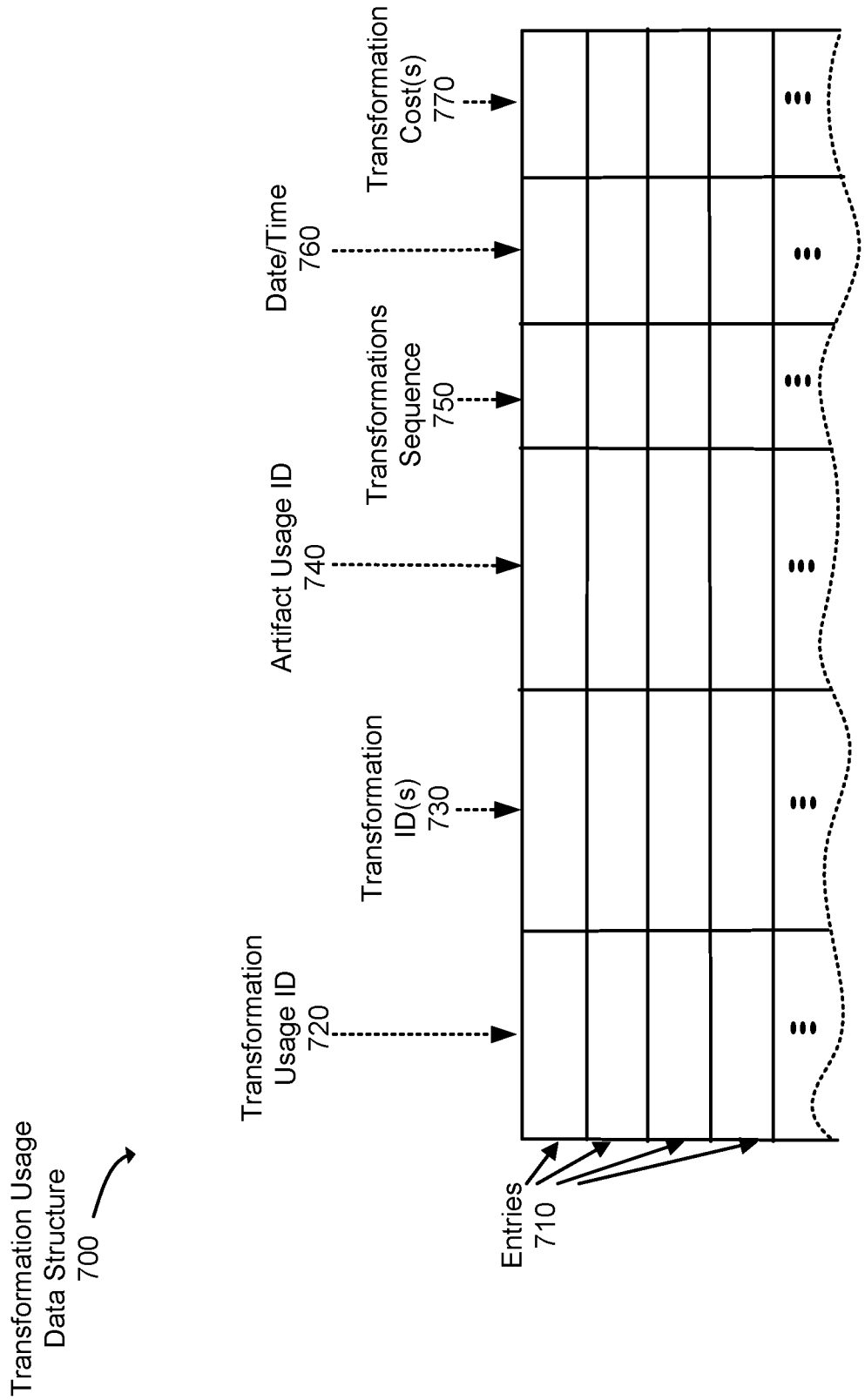
FIG. 7 is a diagram that depicts an exemplary implementation of a transformation usage data structure that may be stored in a database.

FIG. 7 is a diagram that depicts an exemplary implementation of a transformation usage data structure 700 that may be stored in a DB, such as, DB 210, DB(s) 220, and/or DB(s) 230. As shown, the transformation usage data structure 700 may include multiple entries 710, and each entry 710 may include a transformation usage ID field 720, a transformation ID field 730, an artifact usage ID field 740, a transformations sequence field 750, a date/time field 760, and a transformation cost(s) field 770.

Transformation usage ID field 720 stores a unique ID associated with a transformation usage record that is detailed by fields 720-770 of entry 710. Transformation ID field 730 stores a unique ID associated with a transformation used to transform a source artifact to a target artiface. Artifact usage ID field 740 stores stores a unique ID for a particular artifact usage associated with an invocation or request of an artifact. Artifact usage ID field 740 may store an artifact usage ID that points to a particular artifact usage ID stored in a particular field 620 of an entry 610 of data structure 600. The artifact usage ID field 740 may, therefore, serve as a pointer to an entry 610, having a matching artifact usage ID stored in field 620, of data structure 600.

Transformations sequence field 750 stores data identifying a sequence of transformations, including transformation IDs associated with each of the transformations in the sequence and sequence information identifying the particular sequence in which the transformations have been used to transform a source artifact to a target artifact. Date/time field 760 stores data indicating a date and/or time associated with usage of one or more transformations to transform the source artifact to a target artifact. Transformation cost(s) field 770 stores data that indicates a cost associated with transforming the source artifact i into the target artifact. The cost may represent a cost in memory usage, processor usage (e.g., processor time), or a cost associated with other parameters.

To locate a particular entry 710, data structure 700 may be queried with, for example, a transformation usage ID to locate an entry 710 having a matching transformation usage ID stored in field 720. When such an entry 710 is located, data may be stored in one or more fields 720, 730, 740, 750, 760, and/or 770 of the entry 710, or data may be retrieved from one or more of fields 720, 730, 740, 750, 760, and/or 770 of the entry 710. Other fields of an entry 710, instead of transformation usage ID field 720, may be used for querying data structure 700, such as, for example, date/time field 760, or artifact usage ID field 740.

Artifact data structure 400, transformation data structure 500, artifact usage data structure 600, and transformation usage data structure 700 are depicted in FIGS. 4-7 as including tabular data structures with certain numbers of fields having certain content. The tabular data structures shown in FIGS. 4-7, however, are for illustrative purposes. Other types of data structures may alternatively be used. The number, types, and content of the entries and/or fields in the data structures illustrated in FIGS. 4-7 are also for illustrative purposes. Other data structures having different numbers of, types of and/or content of, the entries and/or the fields may be implemented. Therefore, data structures 400, 500, 600, and 700 may include additional, fewer and/or different entries and/or fields than those depicted in FIGS. 4-7.

Figure 8:
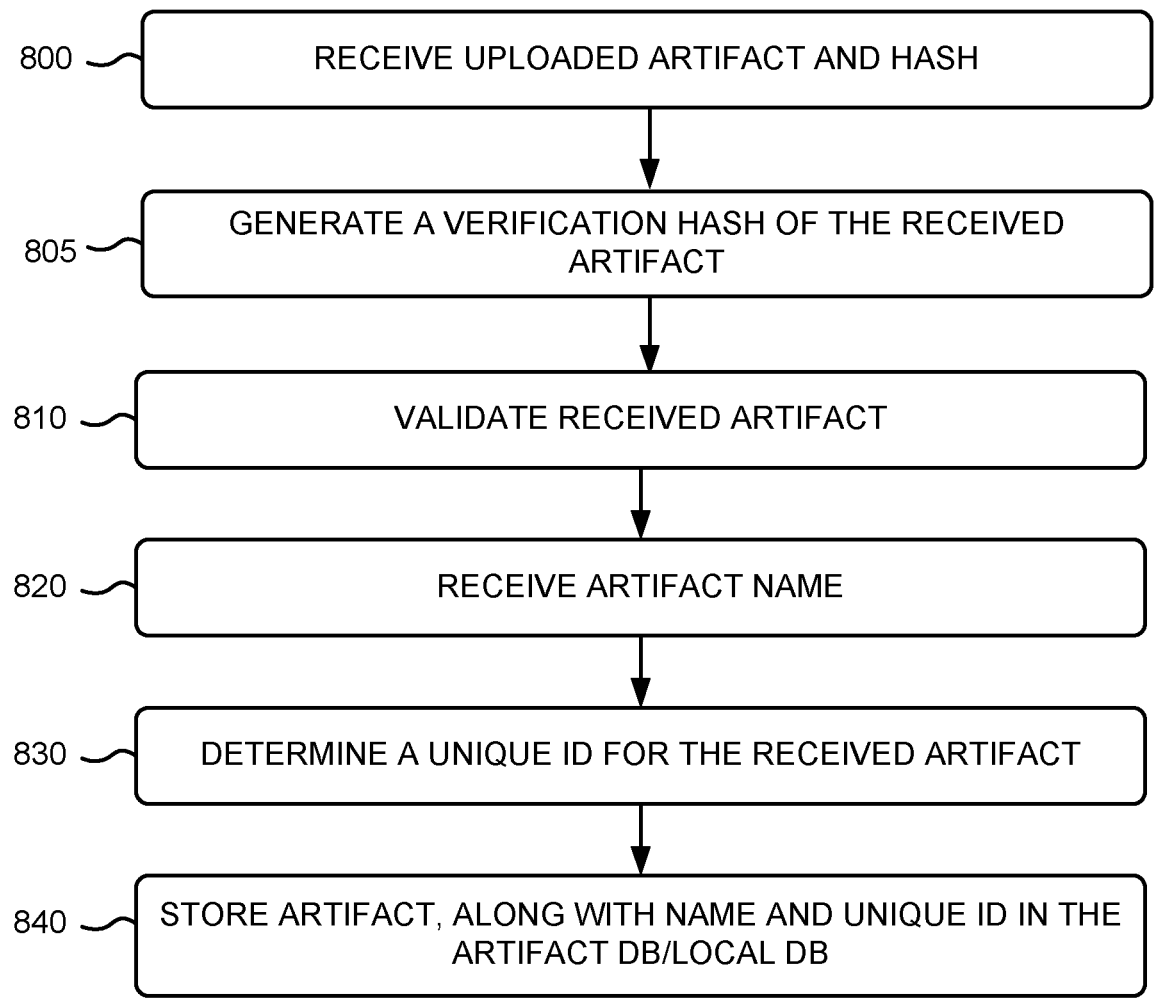
FIG. 8 is a flow diagram of an exemplary process for receiving an uploaded artifact and storing the artifact in a database.

FIG. 8 is a flow diagram of an exemplary process for receiving an uploaded artifact and storing the uploaded artifact in a DB. In one implementation, the exemplary process of FIG. 8 may be executed by artifact management device 205. In other implementations, the exemplary process of FIG. 8 may be executed by another device, such as an end user device 215 or edge device 225. The exemplary process of FIG. 8 is described below with reference to the messaging/operations diagram of FIG. 9, which depicts a generic device 900 and a generic DB 910. In various circumstances, device 900 may include artifact management device 205, an edge device 225, or an end user device 215, and DB 910 may include a DB(s) 220, 230, or 210. The exemplary process of FIG. 8 may be repeated each time an artifact is uploaded for storage. For example, an artifact/transformation creator 240 may generate a new artifact and upload the artifact to artifact management device 205 (or to an edge device 225, or an end user device 215) for storage in a DB, such as DB 210, DB 230, and/or DB 220.

The exemplary process includes a device receiving an uploaded artifact (block 800). Artifact/transformation creator 240 may, for example, create a new artifact and upload the artifact, via network(s) 250, to artifact management device 205. Artifact management device 205 may, in turn, store the received artifact in artifact/transformation DB 210. The originating device (e.g., artifact/transformation creator 240) may use a hash algorithm to generate a hash or digest of the artifact, and may then sign the artifact, or the generated hash, using a private key of a public/private key pair. The originating device appends the signed hash or digest to the artifact when uploading the new artifact. The receiving device generates a verification hash of the received artifact (block 805). The receiving device uses the same hash algorithm, used by the originating device to generate the hash received along with the artifact, to generate the verification hash of the received artifact.

Figure 9:
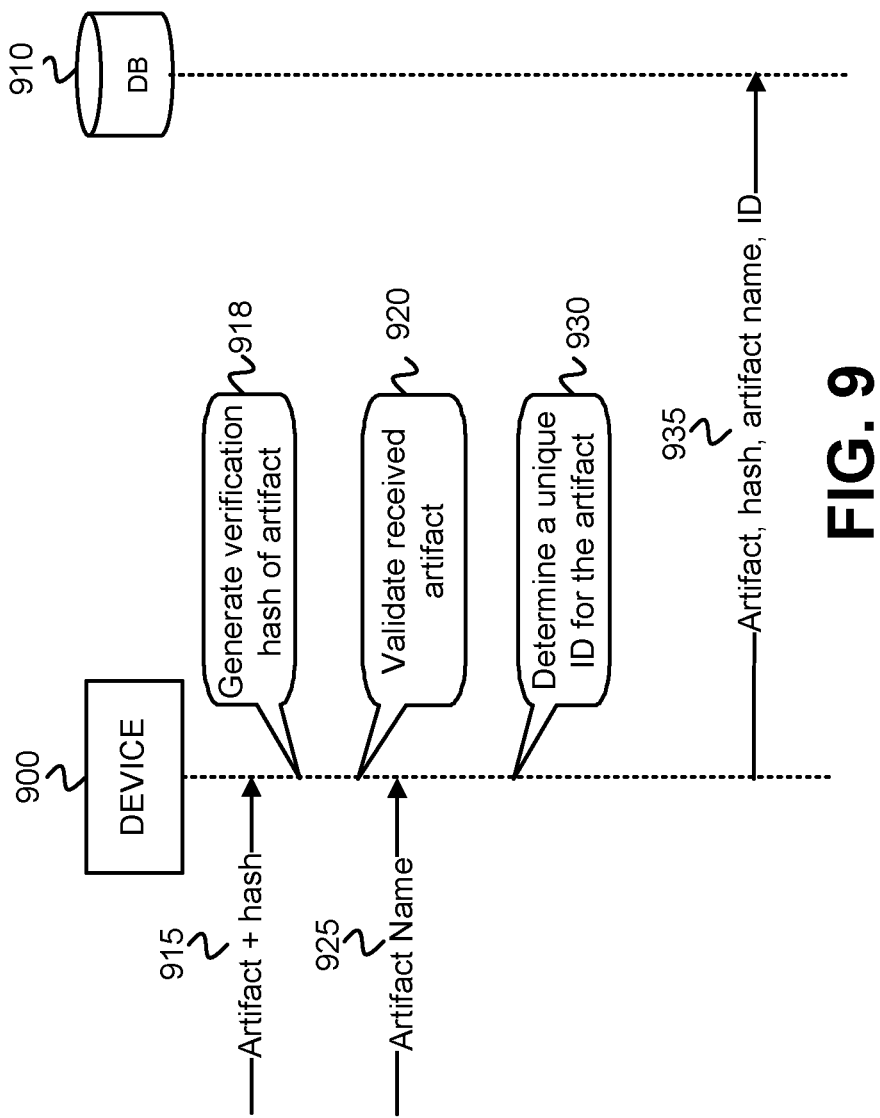
FIG. 9 is a messaging/operations diagram associated with the exemplary process of FIG. 8.

The device validates the received artifact (block 810). The validation process includes comparing the verification hash with the received hash of the artifact to verify that they match, and validating the signature of the signed artifact, or the signed hash. The originating device (e.g., the artifact/transformation creator 240) may sign the artifact or the artifact's hash, using the trusted private key of the private/public key pair, and the receiving device (e.g., the artifact management device 205) may validate the signature of the received artifact or the received artifact's hash using the public key of the originating device using an existing signature validation algorithm. FIG. 9 depicts an example of a device 900 receiving 915 an artifact and the artifact's hash, generating 918 a verification hash of the artifact, and then validating 920 the artifact to determine its authenticity. If the validation process of block 810 fails, then the device may discard the received artifact and hash, without storing the artifact, as described below with respect to block 840.

The device receives an artifact name (block 820). For example, artifact management device 205 may receive the artifact name, via network(s) 205, from artifact/transformation creator 240. The artifact name may include a textual, or alphanumeric, name that serves as a type of identifier for the artifact. The device determines a unique ID for the received artifact (block 830). For example, artifact management device 205 may use an algorithm to generate a universally unique identifier (UUID). FIG. 9 depicts device 900 receiving an artifact name 925, and determining 930 a unique ID for the received artifact.

The device stores the artifact, along with the received hash, the artifact name, and the artifact's unique ID in a data structure 400 of a DB, such as DB 210, 220, and/or 230 (block 840). For example, the device may store, in an entry 410 of artifact data structure 400, the unique ID in artifact ID field 420, the artifact in artifact field 430, the name in artifact name field 440, and the received hash in artifact hash/digest field 450. After storage in data structure 400, the stored artifact may be subsequently retrieved by, for example, artifact management device 205, edge device 225, and/or end user device 215. FIG. 9 depicts device 900 sending data 935, that includes the artifact, artifact name, and unique ID, to DB 910 for storage in data structure 400.

Figure 10A:
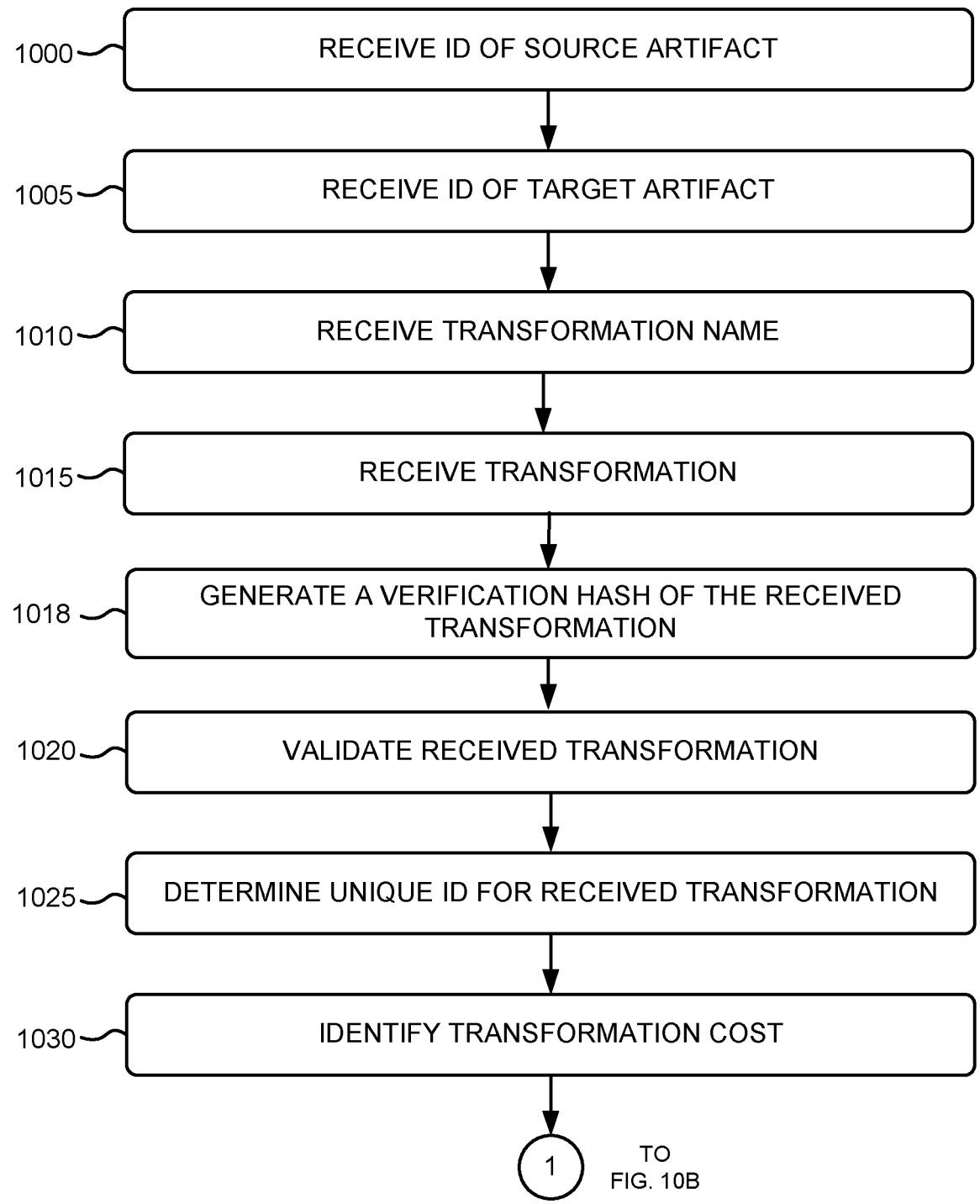
FIGS. 10A and 10B are flow diagrams of an exemplary process for registration of a transformation that may be used for transforming a source artifact into a target artifact.
Figure 10B:
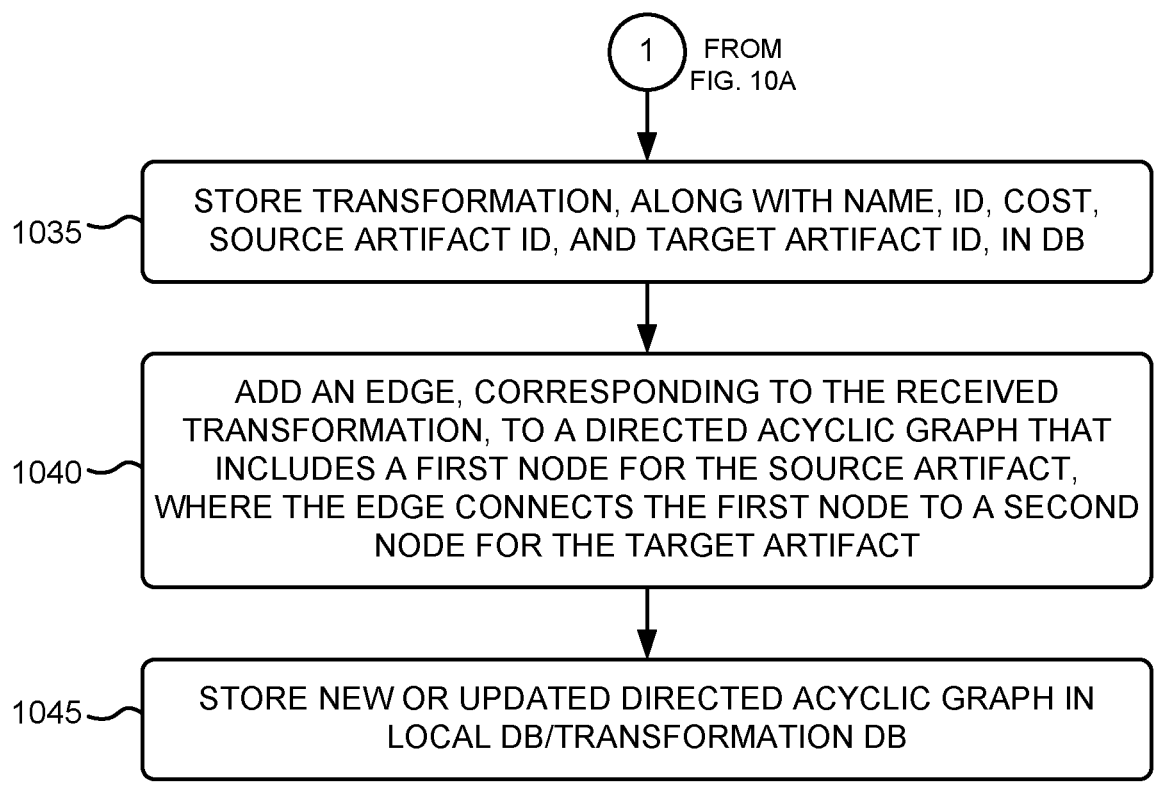

FIGS. 10A and 10B are flow diagrams of an exemplary process for registration of a transformation that may be used for transforming a source artifact into a target artifact. In one implementation, the exemplary process of FIGS. 10A-10B may be executed by artifact management device 205. In other implementations, the exemplary process of FIGS. 10A and 10B may be executed by another device, such as an end user device 215 or edge device 225. The exemplary process of FIGS. 10A-10B is described below with reference to the messaging/operations diagram of FIG. 11, which depicts a generic device 1100 and a generic DB 1105. In various circumstances, device 1100 may include artifact management device 205, an edge device 225, or an end user device 215, and DB 1105 may include a DB(s) 220, 230, or 210. The exemplary process of FIGS. 10A-10B may be repeated each time a transformation is generated and stored for future retrieval. For example, an artifact/transformation creator 240 may generate a new transformation and upload the transformation to artifact management device 205 (or to an edge device 225, or an end user device 215) for storage in a DB, such as DB 210, DB 230, and/or DB 220.

The exemplary process includes a device receiving an ID of a source artifact (block 1000)(FIG. 10A). Artifact management device 205, for example, may receive, from artifact/transformation creator 240 a unique ID associated with a newly created transformation. The device may use an algorithm to generate a universally unique identifier (UUID).

Figure 11:
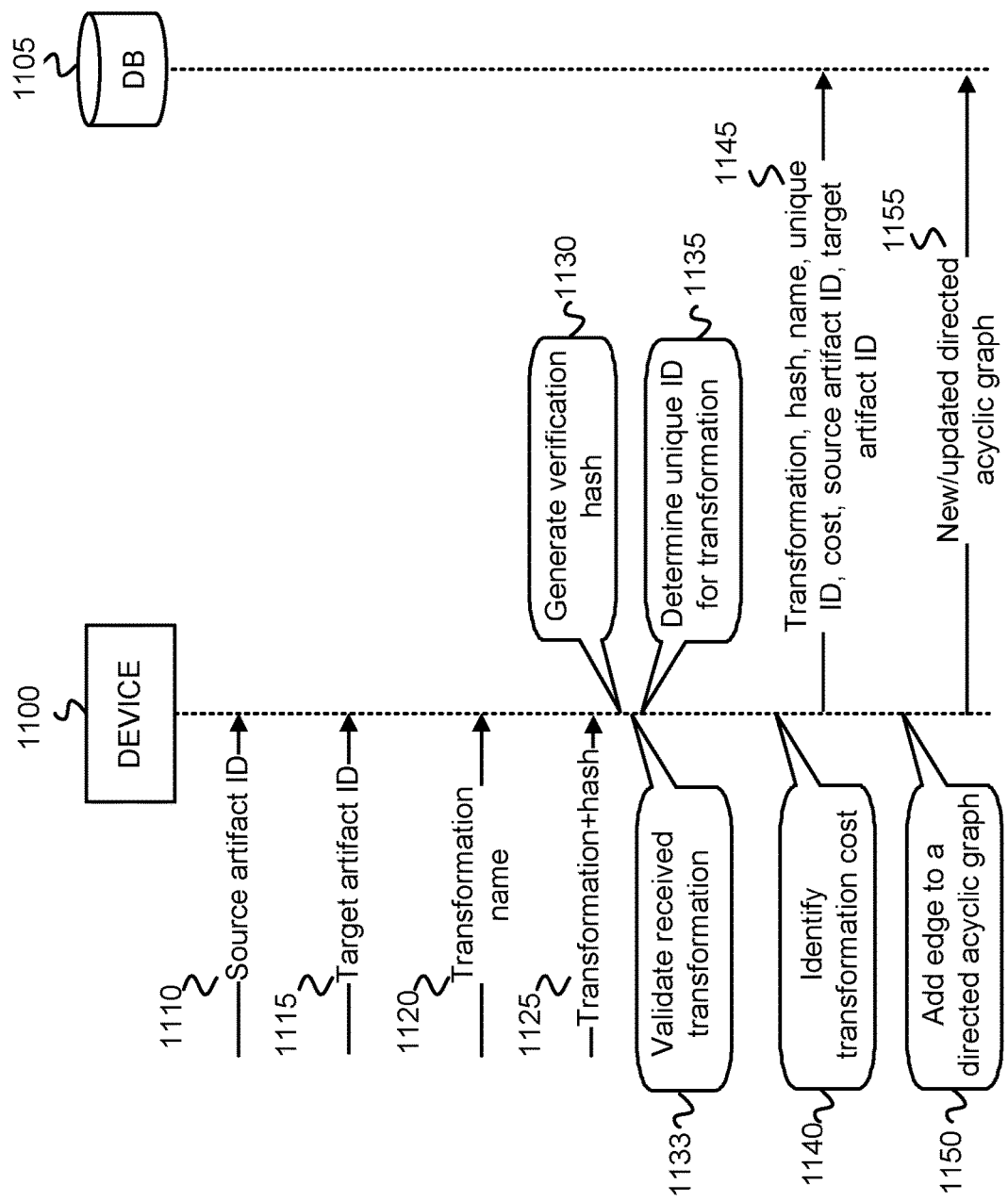
FIG. 11 is a messaging/operations diagram associated with the exemplary process of FIGS. 10A and 10B.

The device further receives an ID of a target artifact (block 1005), a transformation name (block 1010), and the transformation and a hash or digest or the transformation (block 1015). The transformation name may include a textual, or alphanumeric, name that serves as a type of identifier for the transformation. The transformation may include a transformation data unit that specifies how to transform the source artifact to the target artifact. In one implementation, the transformation data unit may specify a binary difference between the source image and the target image that can be used to transform the source image into the target image. The originating device (e.g., artifact/transformation creator 240) may use a hash algorithm to generate a hash or digest of the transformation, and may then sign the transformation, or the generated hash, using a private key of a public/private key pair. In the case where the originating device signs the generated hash, the originating device appends the signed hash or digest to the transformation prior to sending the transformation to the receiving device. FIG. 11 depicts device 1100 receiving a source artifact ID 1110, a target artifact ID 1115, a transformation name 1120, and a transformation and hash 1125.

The device generates a verification hash of the received transformation (block 1018). Upon receipt of the transformation and the hash from the originating device, the receiving device generates the verification hash of the received transformation using the same hash algorithm, used by the originating device to generate the hash received along with the transformation, to generate the verification hash of the received transformation. FIG. 11 depicts device 1100 generating 1130 the verification hash.

The device validates the received transformation (block 1020). The validation process includes comparing the verification hash with the received hash of the transformation to verify that they match, and validating the signature of the signed transformation, or the signed hash of the transformation. The originating device (e.g., the artifact/transformation creator 240) may sign the transformation or the transformation's hash, using the trusted private key of the private/ public key pair, and the receiving device (e.g., the artifact management device 205) may validate the signature of the received transformation or the received transformation's hash using the public key of the originating device and an existing signature validation algorithm. FIG. 11 depicts an example of a device 1100 validating 1133 the transformation to determine its authenticity. If the validation process of block 1020 fails, then the device may discard the received transformation and hash, without storing the transformation, as described below with respect to block 1035.

The device determines a unique ID for the received transformation (block 1025). For example, the device may use an algorithm to generate a universally unique identifier (UUID) for the received transformation. FIG. 11 depicts device 1100 determining 1135 a unique ID for the transformation. The device identifies a transformation cost associated with the received transformation (block 1030). The transformation cost may represent a cost in memory usage, processor usage (e.g., processor time), or a cost associated with other parameters, for transforming the source artifact to the target artifact. FIG. 11 depicts device 1100 identifying 1140 a transformation cost for the received transformation.

The device stores the transformation, along with the name, ID, cost, source artifact ID, and target artifact ID, in a DB, such as DB 210, DB(s) 220, and/or DB(s) 230 (block 1035)(FIG. 10B). The device stores, within a particular entry 510 of transformation data structure 500, the received transformation in transformation field 530, the received hash of the transformation in field 580, the received name in transformation name field 540, the unique ID in transformation ID field 520, the determined transformation cost in cost field 550, the source artifact ID in field 560, and the target artifact ID in field 570. FIG. 11 depicts device 1100 storing 1145 the transformation, hash, transformation name, unique ID, cost, source artifact ID, and target artifact ID in DB 1105.

Figure 12:
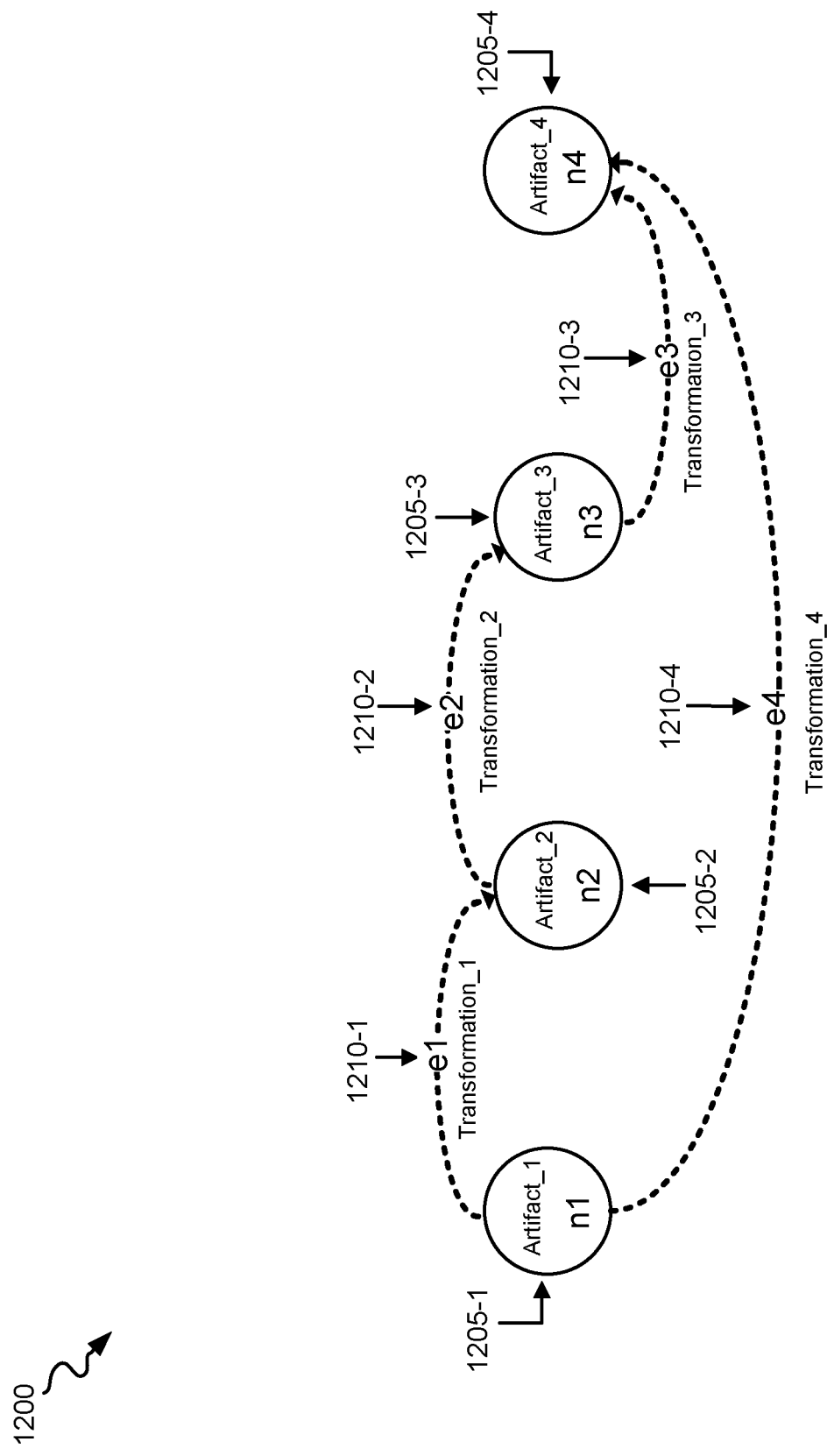
FIG. 12 is a diagram that depicts an exemplary directed acyclic graph that details transformations between different artifacts.

The device adds an edge, corresponding to the received transformation, to a directed acyclic graph that includes a first node for the source artifact, where the edge connects the first node to a second node for the target artifact (block 1040). FIG. 12 depicts an exemplary directed acyclic graph 1200 that includes 4 nodes, and 4 edges. In the example of FIG. 12, node n3 1205-3 corresponds to the source artifact, the unique ID of which was received in block 1000, and a new node n4 1205-4 has been added to the directed acyclic graph 1200 to represent the target artifact, the unique ID of which was received in block 1005. A new edge e3 1210-3, shown in FIG. 12, may further be added between nodes n3 1205-3 and n4 1205-4 to represent the transformation received in block 1015. The new edge e3 1210-3 may be associated with an edge cost that equals the transformation cost determined in block 1025. The directed acyclic graph 1200 of FIG. 12 represents only a single example of a directed acyclic graph. Numerous different directed acyclic graphs, having different numbers of nodes, different edges, and different edge costs, may be constructed and used in the exemplary processes described herein. FIG. 11 depicts device 1100 adding 1150 an edge to the directed acyclic graph.

The device stores the new or updated directed acyclic graph in a DB, that may include DB 210, DB(s) 220, and/or DB(s) 230 (block 1045). The DB (e.g., DB 210, DB(s) 220, and/or DB(s) 230) may store a data structure that further stores one or more different directed acyclic graphs which may, as described further below, be searched and analyzed to identify transformations for use in transforming a particular source artifact into a particular target artifact. FIG. 11 depicts device 1100 storing 1155 the new or updated directed acyclic graph in DB 1105.

Figure 13A:
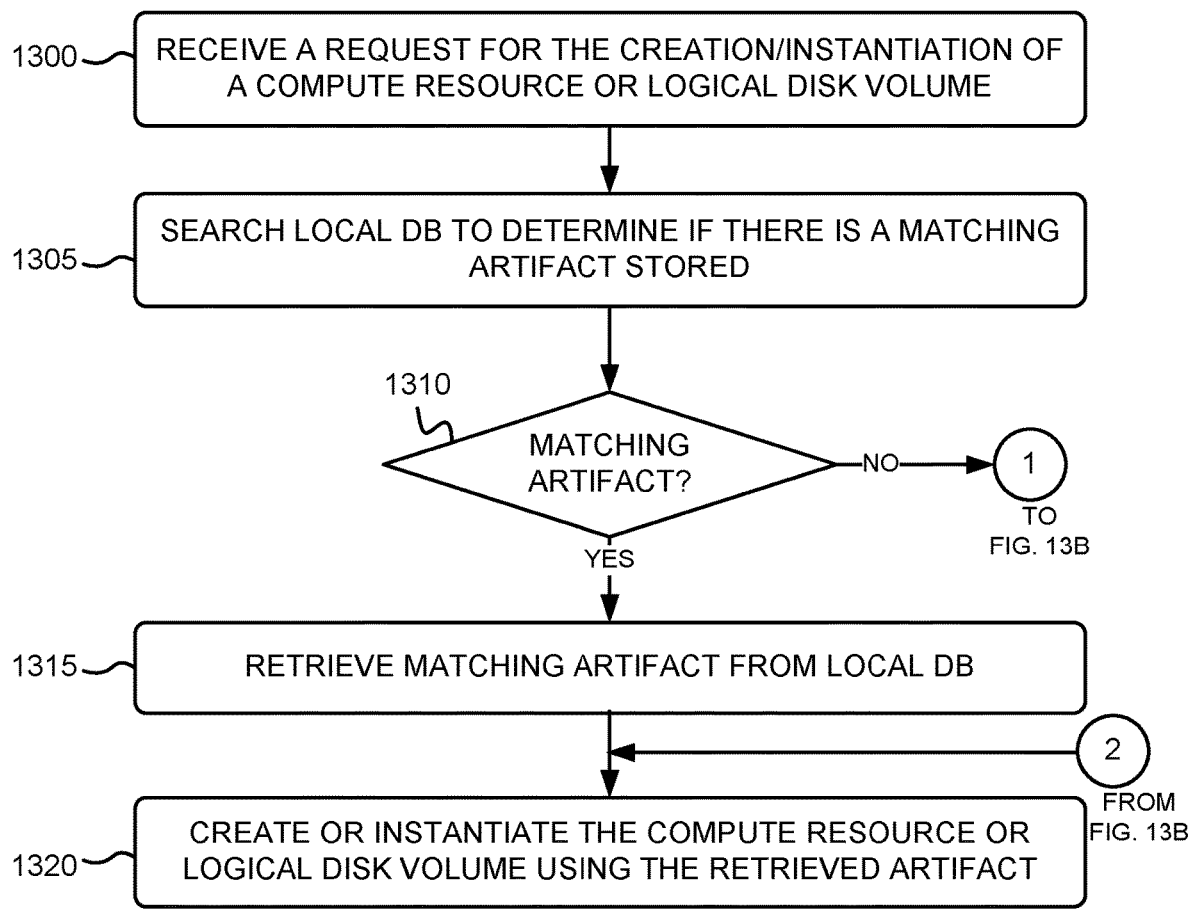
FIGS. 13A and 13B are flow diagrams of an exemplary process for obtaining one or more transformations for transforming a locally stored source artifact, transforming the source artifact to a target artifact, and creating/instantiating a compute resource using the generated target artifact.
Figure 13B:
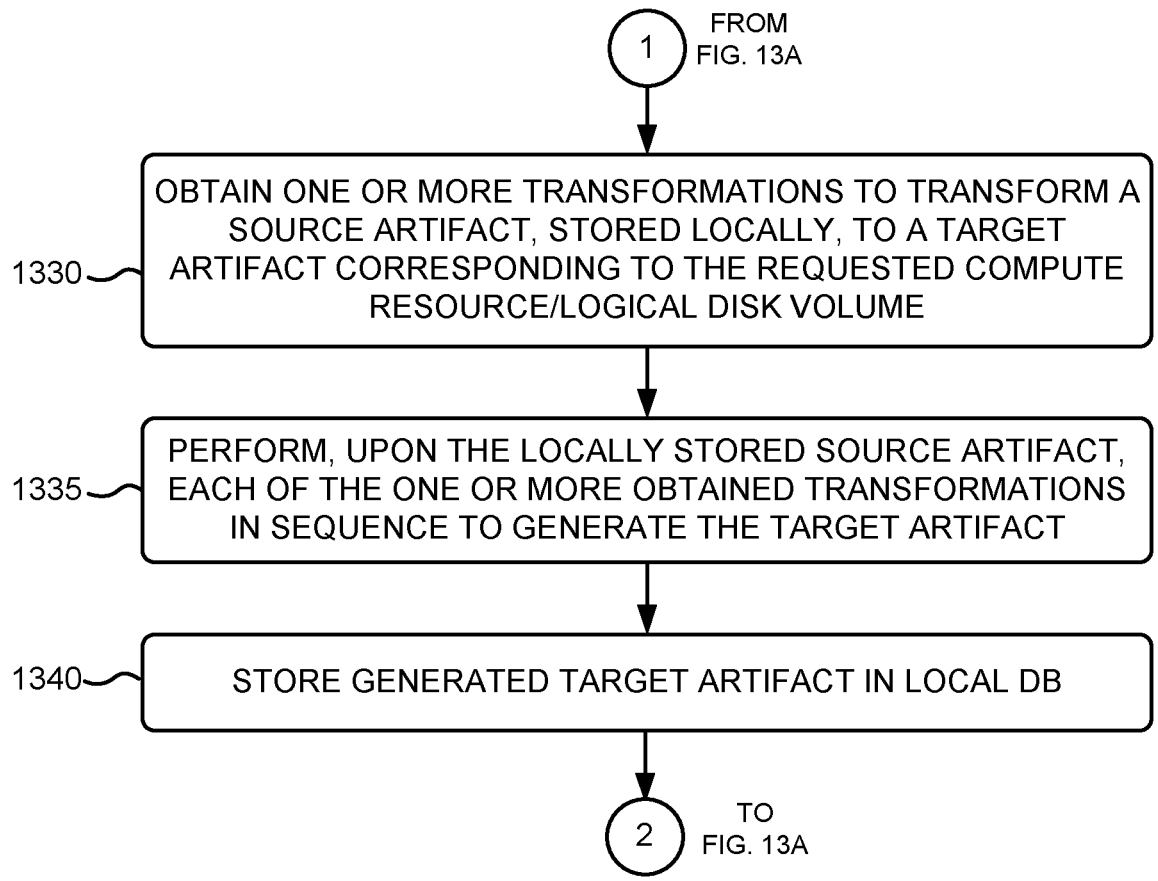

FIGS. 13A and 13B are flow diagrams of an exemplary process for obtaining, at an end user device 215 or an edge device 225, one or more transformations for transforming a locally stored source artifact, transforming the source artifact to a target artifact, and creating/instantiating the compute resource or logical disk volume using the generated target artifact. The exemplary process of FIGS. 13A and 13B is described below with reference to the messaging/operations diagrams of FIG. 14, which depicts a generic device 1400 and a generic DB 1405. In various circumstances, device 1400 may include an end user device 215, an edge device 225, or artifact management device 205, and DB 1405 may include a DB(s) 220, 230, or 210. The exemplary process of FIGS. 13A and 13B may be repeated for each request to create or instantiate a compute resource or logical disk volume received at an end user device 215 or an edge device 225.

Figure 14:
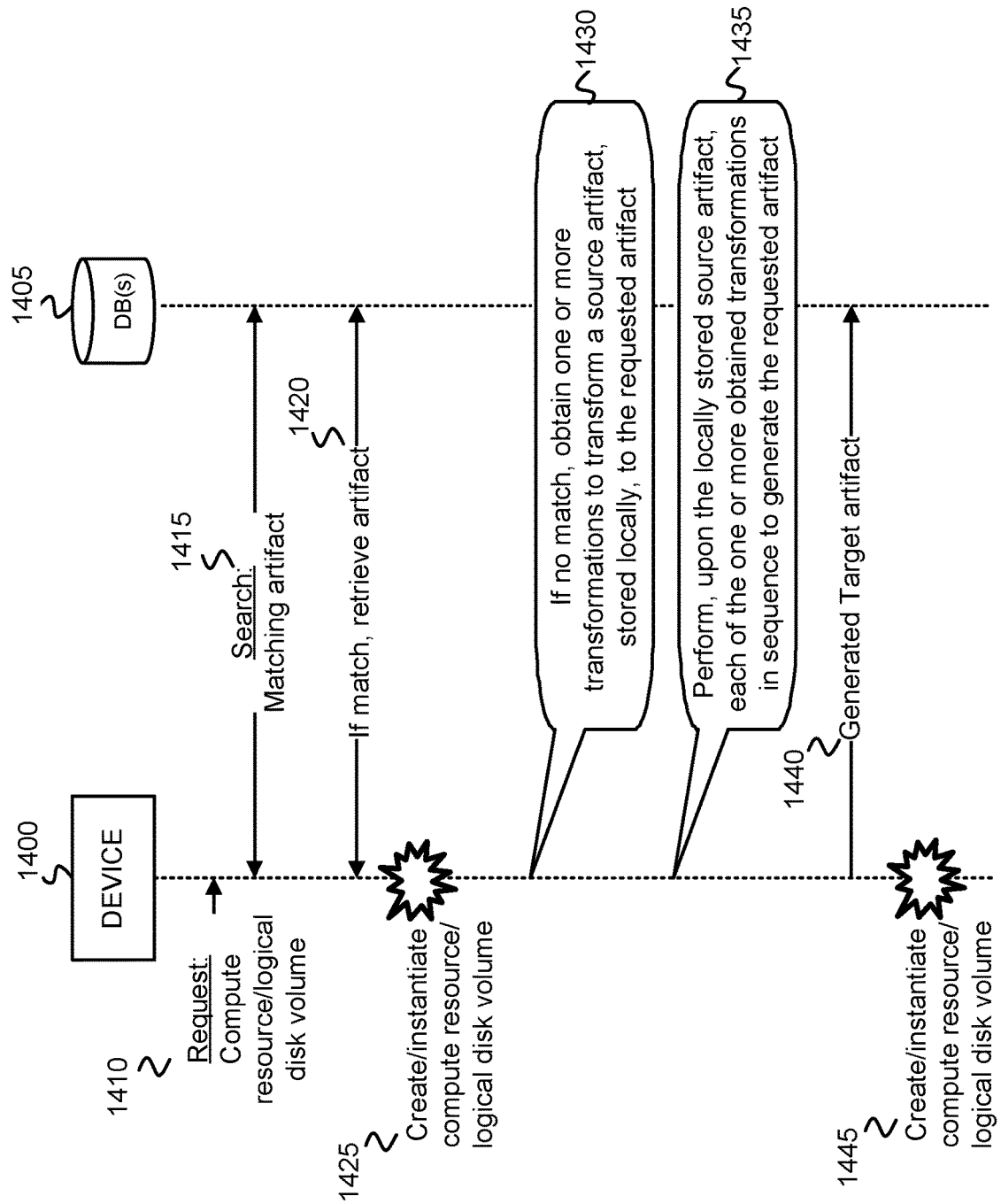
FIG. 14 is a messaging/operations diagram associated with the exemplary process of FIGS. 13A and 13B.

The exemplary process includes a device receiving a request for the creation or instantiation of a compute resource or logical disk volume (block 1300). For example, an end user device 215 may receive a request from a user of the device 215 to create or instantiate a specific compute resource, such as, for example, a specific VM, baremetal, or container, or a logical disk volume. The device searches a local DB to determine if there is a matching artifact stored that corresponds to the requested compute resource or logical disk volume (block 1305). If an end user device 215 receives the request for creation/instantiation of the compute resource or logical disk volume, end user device 215 may search a corresponding local DB(s) 220 stored at device 215. If an edge device 225 receives the request for creation/instantiation of the compute resource or logical disk volume, edge device 225 may search a corresponding local DB(s) 230 stored at device 225. FIG. 14 depicts device 1400 receiving a request 1410 to create or instantiate a particular compute resource, and device 1400 searching DB(s) 1405 for a matching artifact that corresponds to the requested compute resource.

If the device determines that the DB stores a matching artifact (YES—block 1310), then the device retrieves the matching artifact from the local DB (block 1315). The device may then create or instantiate the requested compute resource or logical disk volume using the retrieved artifact (block 1320). For example, if the matching artifact includes an image, the device may create or instantiate a VM, a baremetal, or a container using the retrieved image. As another example, if the matching artifact includes a snapshot, then device may create or instantiate a logical disk volume using the retrieved snapshot. FIG. 14 depicts device 1400 retrieving 1420 the matching artifact from DB(s) 1405 and creating or instantiating 1425 the compute resource or logical disk volume.

If the device determines that DB does not store a matching artifact (NO—block 1310; FIG. 13B), then the device obtains one or more transformations to transform a source artifact, stored locally at the device, to a target artifact that corresponds to the requested compute resource or logical disk volume (block 1330)(FIG. 13B). An exemplary implementation of the obtaining of the one or more transformations of block 1330 is described in further detail below with respect to the process of FIG. 15. The device performs, upon the locally stored source artifact, each of the one or more obtained transformations, in a prescribed sequence, to generate the target artifact (block 1335). FIG. 14 depicts device 1400 obtaining 1430, if no matching artifact is found locally in the DB(s) 1405, one or more transformations to transform the source artifact, stored locally, to the artifact corresponding to the requested compute resource. FIG. 14 further shows device 1400 performing 1435, upon the locally stored source artifact, each of the one or more obtained transformations in sequence to generate the requested artifact.

The device stores the generated target artifact in the local DB (block 1340), and creates or instantiates the requested compute resource or logical disk volume using the generated target artifact (block 1320)(FIG. 13A). FIG. 14 depicts device 1400 sending the generated target artifact 1440 to DB(s) 1405 for storage and creating/instantiating 1445 the compute resource or logical disk volume.

Figure 15:
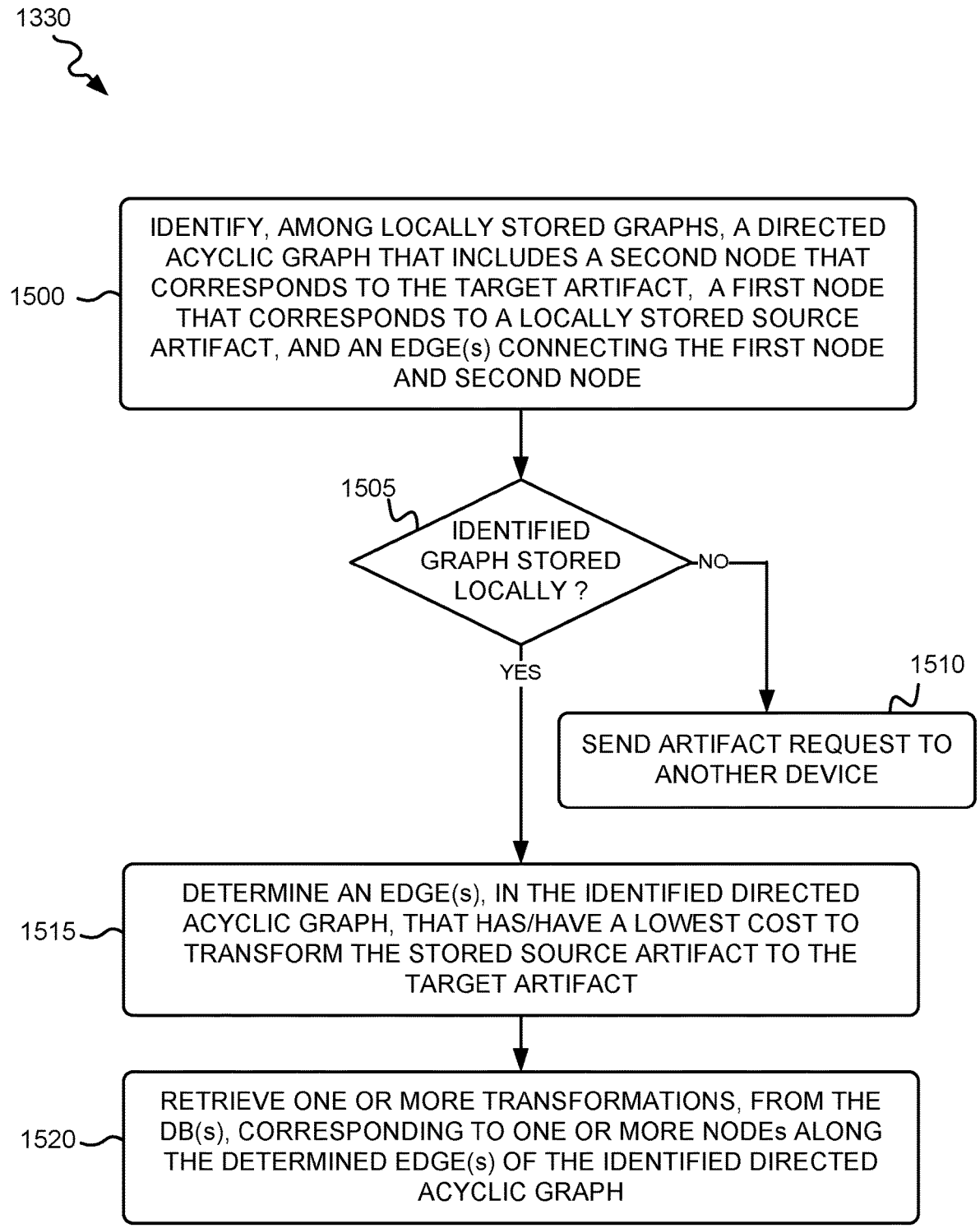
FIG. 15 is a flow diagram that depicts details of one exemplary implementation of block 1330 of FIGS. 13A and 13B.

FIG. 15 is a flow diagram that depicts details of one exemplary implementation of block 1330 of FIGS. 13A and 13B. The blocks of FIG. 15, therefore, represent one exemplary implementation of obtaining one or more transformations to transform a source artifact to a target artifact. The blocks of FIG. 15 may be executed by, for example, artifact management device 205, end user device 215, and/or edge device 225. The exemplary process of FIG. 15 is described below with reference to the example directed acyclic graph of FIG. 12. The exemplary process of FIG. 15 may be repeated at a device at each occurrence of block 1330 of the process of FIGS. 13A and 13B.

The exemplary process includes the device identifying, among locally stored graphs, a directed acyclic graph that includes a second node that corresponds to the target artifact, a first node that corresponds to a locally stored source artifact, and an edge(s) connecting the first node and the second node (block 1500). For example, the exemplary directed acyclic graph 1200 of FIG. 12 may be identified as including a node n4 1205-4 that corresponds to the target artifact, a node n1 1205-1 that corresponds to a locally stored artifact, and edges e1, e2, and e3, or edge e4, that connect node n1 1205-1 to node n4 1205-4.

If the directed acyclic graph, identified in block 1500, is not stored locally (NO—block 1505), then the device sends an artifact request to another device (block 1510). The other device may receive and respond to the artifact request as described below with respect to the exemplary process of FIG. 16. For example, if the device is an end user device 215, the end user device 215 may send an artifact request to an edge device 225, or to artifact management device 205, to obtain the target artifact. As another example, if the device is an edge device 225, the edge device 225 may send an artifact request to artifact management device 205 to obtain the target artifact.

If the directed acyclic graph, identified in block 1500, is stored locally (YES—block 1505), then the device determines an edge(s), in the identified directed acyclic graph, that has/have a lowest cost to transform the stored artifact to the target artifact (block 1515). Referring again to the exemplary directed acyclic graph 1200 of FIG. 12, the device, evaluates the edges of all paths between the locally stored artifact represented by n1 1205-1 and the target artifact represented by n4 1205-1. In graph 1200, a first path between n1 1205-1 and n4 1205-4 includes edges e1 1210-1, e2 1210-2, and e3 1205-3, and a second path between n1 1205-1 and n4 1205-4 includes edge e4 1210-4. In this example, assume that e1 has a cost of 5, e2 has a cost of 5, and e3 has a cost of 3, for a total cost across all three edges of 13. Additionally, assume that e4 has a cost of 18. Therefore, in this particular example, the device determines that the path of graph 1200 between node n1 1205-1 and node n4, that includes edges e1, e2, and e3, has a lower total cost than the path of graph 1200 that includes edge e4.

The device retrieves one or more transformations, from the DB(s), corresponding to the one or more nodes along the determined edge(s) of the identified directed acyclic graph (block 1520). In the directed acyclic graph 1200 of FIG. 12, each edge e1 1210-1, e2 1210-2, and e3 1210-3 along the lowest cost path between node n1 1205-1 and n4 1205-4 may be associated with a unique transformation ID. The device may perform a lookup into the DB (e.g., DB(s) 220, DB(s) 230, and/or DB 210) to identify entries 510 having transformation IDs stored in field 520 that match the transformation IDs of the edges of the lowest cost path. For each identified entry 510, the device retrieves the data from one or more of fields 530-580. For example, for each identified entry, the device may retrieve a transformation from field 530. The retrieved one or more transformations may subsequently be used by the device to, as described with respect to block 1335 of FIG. 13B, perform each of the retrieved transformations in the sequence identified in the directed acyclic graph 1200. For example, in the specific example graph 1200 of FIG. 12, the transformation represented by edge e1 1210-1 is performed first upon the locally stored artifact, the transformation represented by edge e2 1210-2 is performed second upon the results of the first transformation, and the transformation represented by edge e3 1210-3 is performed third upon the results of the second transformation to generate the target artifact as the end result of the transformation process.

Figure 16:
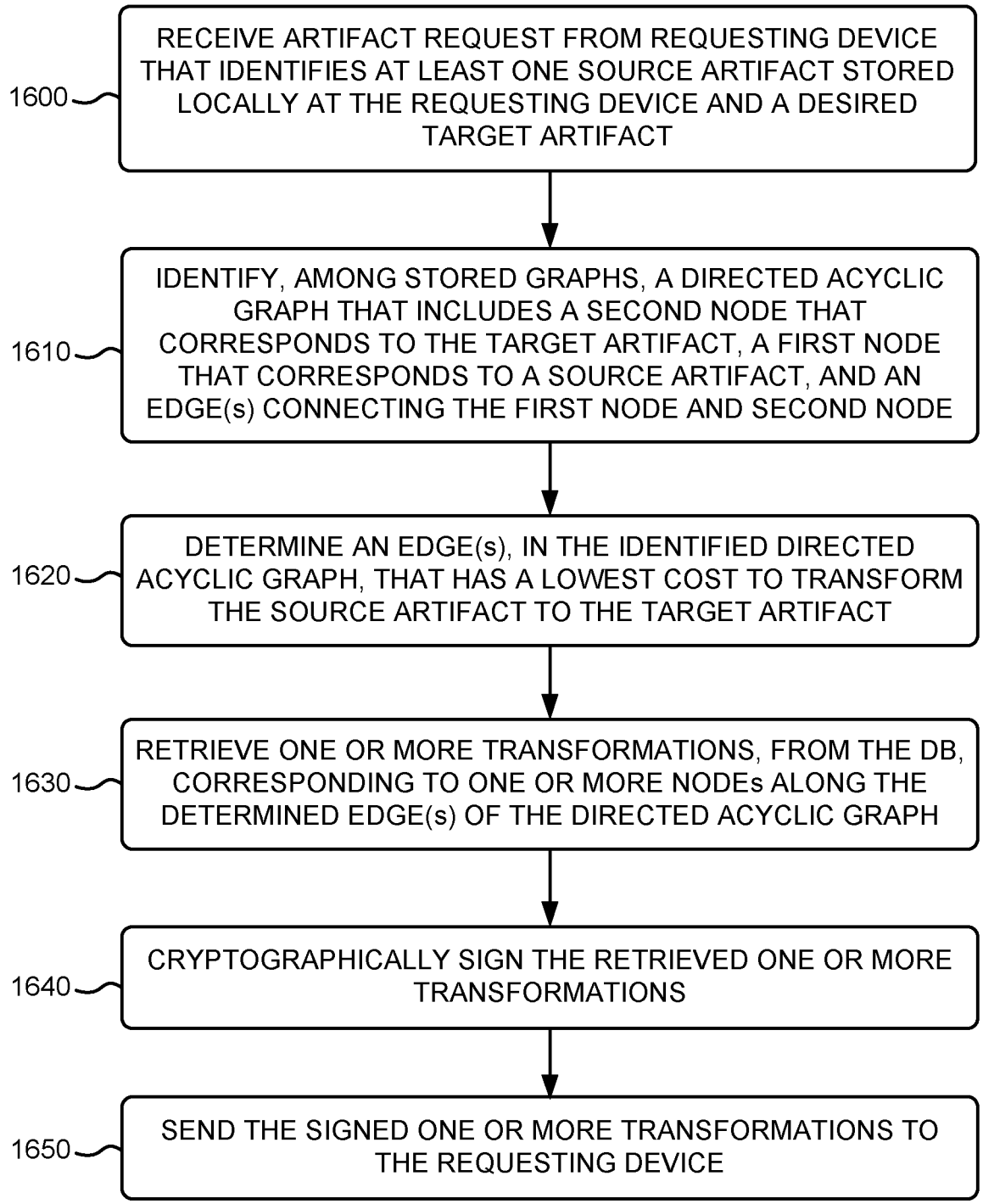
FIG. 16 is a flow diagram of an exemplary process for receiving an artifact request from another device, retrieving one or more transformations that correspond to the requested artifact, and sending the retrieved one or more transformations to the other device.

FIG. 16 is a flow diagram of an exemplary process for receiving an artifact request from another device, retrieving one or more transformations that correspond to the requested artifact, and sending the retrieved one or more transformations to the other device. The process of FIG. 16 may be executed by, for example, artifact management device 205, edge device 225, or end user device 225. For example, artifact management device 205 may receive an artifact request from an edge device 225, or an edge device 225 may receive an artifact request from an end user device 215. The exemplary process of FIG. 16 is described below with reference to the messaging/operations diagrams of FIG. 17, and the exemplary directed acyclic graph 1200 of FIG. 12. In the messaging/operations diagram of FIG. 17, the depicted device 1700 may include edge device 225 or artifact management device 205, and 1705 may include DB(s) 230, or DB 210. The exemplary process of FIG. 16 may be repeated at a device at each receipt of an artifact request from another device.

Figure 17:
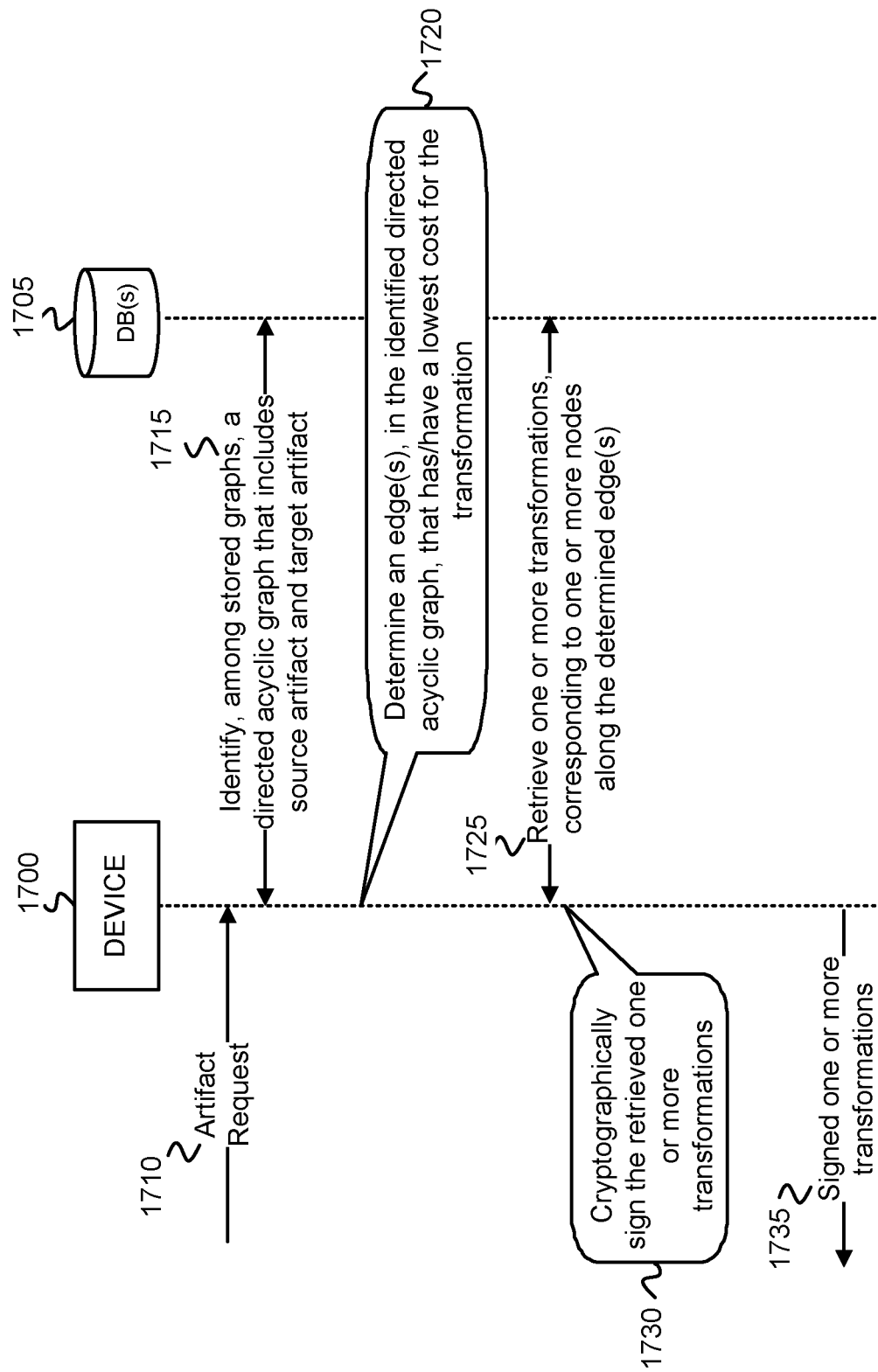
FIG. 17 is a messaging/operations diagram associated with the exemplary process of FIG. 16.

The exemplary process includes a device receiving an artifact request from a requesting device that identifies at least one source artifact stored locally at the requesting device and a desired target artifact (block 1600). The requesting device, such as an end user device 215 or an edge device 225, may require a target artifact that is not stored locally, but, however, may have one or more other source artifacts stored locally. In such a situation, the requesting device sends an artifact request to obtain one or more artifact transformations from, for example, an edge device 225 or artifact management device 205, that can be used to transform one of the at least one locally stored source artifacts to the desired target artifact. The artifact request may, for example, include a list of source artifacts that are stored locally at the device, and which may be used as a basis for transforming one of the source artifacts to the target artifact. FIG. 17 depicts device 1700 receiving an artifact request 1710.

The device identifies, among stored graphs, a directed acyclic graph that includes a second node that corresponds to the target artifact, a first node that corresponds to a locally stored source artifact, and an edge(s) connecting the first node and the second node (block 1610). For example, the exemplary directed acyclic graph 1200 of FIG. 12 may be identified as including a node n4 1205-4 that corresponds to the target artifact, a node n1 1205-1 that corresponds to a locally stored artifact, and edges e1, e2, and e3, or edge e4, that connect node n1 1205-1 to node n4 1205-4. In an implementation in which the requesting device sends a list of multiple source artifacts locally stored at the requesting device, the device receiving the artifact request identifies a directed acyclic graph that includes a second node that corresponds to the target artifact, a first node that corresponds to one of the multiple source artifacts contained in the list of source artifacts stored locally at the requesting device, and an edge(s) connecting the first node and the second node. FIG. 17 depicts device 1700 identifying 1715, among stored directed acyclic graphs, a graph that includes nodes corresponding to the source artifact and the desired target artifact.

The device determines an edge(s), in the identified directed acyclic graph, that has/have a lowest cost to transform the source artifact to the target artifact (block 1620). Referring again to the exemplary directed acyclic graph 1200 of FIG. 12, the device, evaluates the edges of all paths between the locally stored artifact represented by n1 1205-1 and the target artifact represented by n4 1205-1. In graph 1200, a first path between n1 1205-1 and n4 1205-4 includes edges e1 1210-1, e2 1210-2, and e3 1205-3, and a second path between n1 1205-1 and n4 1205-4 includes edge e4 1210-4. In this example, assume that e1 has a cost of 5, e2 has a cost of 5, and e3 has a cost of 3, for a total cost across all three edges of 13. Additionally, assume that e4 has a cost of 18. Therefore, in this particular example, the device determines that the path of graph 1200 between node n1 1205-1 and node n4, that includes edges e1, e2, and e3, has a lower total cost than the path of graph 1200 that includes edge e4. FIG. 17 depicts device 1700 determining 1720 an edge(s), in the identified directed acyclic graph, that has/have a lowest cost for the transformation.

The device retrieves one or more transformations, from the DB, corresponding to one or more nodes along the determined edge(s) of the directed acyclic graph (block 1630). In the directed acyclic graph 1200 of FIG. 12, each edge e1 1210-1, e2 1210-2, and e3 1210-3 along the lowest cost path between node n1 1205-1 and n4 1205-4 may be associated with a unique transformation ID. The device may perform a lookup into the DB (e.g., DB(s) 230, and/or DB 210) to identify entries 510 having transformation IDs stored in field 520 that match the transformation IDs of the edges of the lowest cost path. For each identified entry 510, the device retrieves the data from one or more fields 530-580. For example, for each identified entry, the device may retrieve a transformation from field 530. FIG. 17 depicts device 1700 retrieving 1725 one or more transformations corresponding to one or more nodes along the determined edge(s) of the identified directed acyclic graph.

The device cryptographically signs the retrieved one or more transformations (block 1640) and sends the signed one or more transformations to the requesting device (block 1650). The device may use a private key, that is part of a public/private key pair, to cryptographically sign the retrieved one or more transformations. Thus, upon receipt of the signed one or more transformations, the requesting device may use a previously distributed public key to validate the signed one or more transformations. Subsequent to validation, the requesting device may, as described with respect to block 1335 of FIG. 13B, perform each of the received transformations in the sequence originally identified in the directed acyclic graph 1200. For example, in the specific example graph 1200 of FIG. 12, the transformation represented by edge e1 1210-1 is performed first upon the locally stored artifact, the transformation represented by edge e2 1210-2 is performed second upon the results of the first transformation, and the transformation represented by edge e3 1210-3 is performed third upon the results of the second transformation. FIG. 17 depicts device 1700 cryptographically signing 1730 the retrieved one or more transformations and sending a message 1735 that includes the signed one or more transformations.

Figure 18:
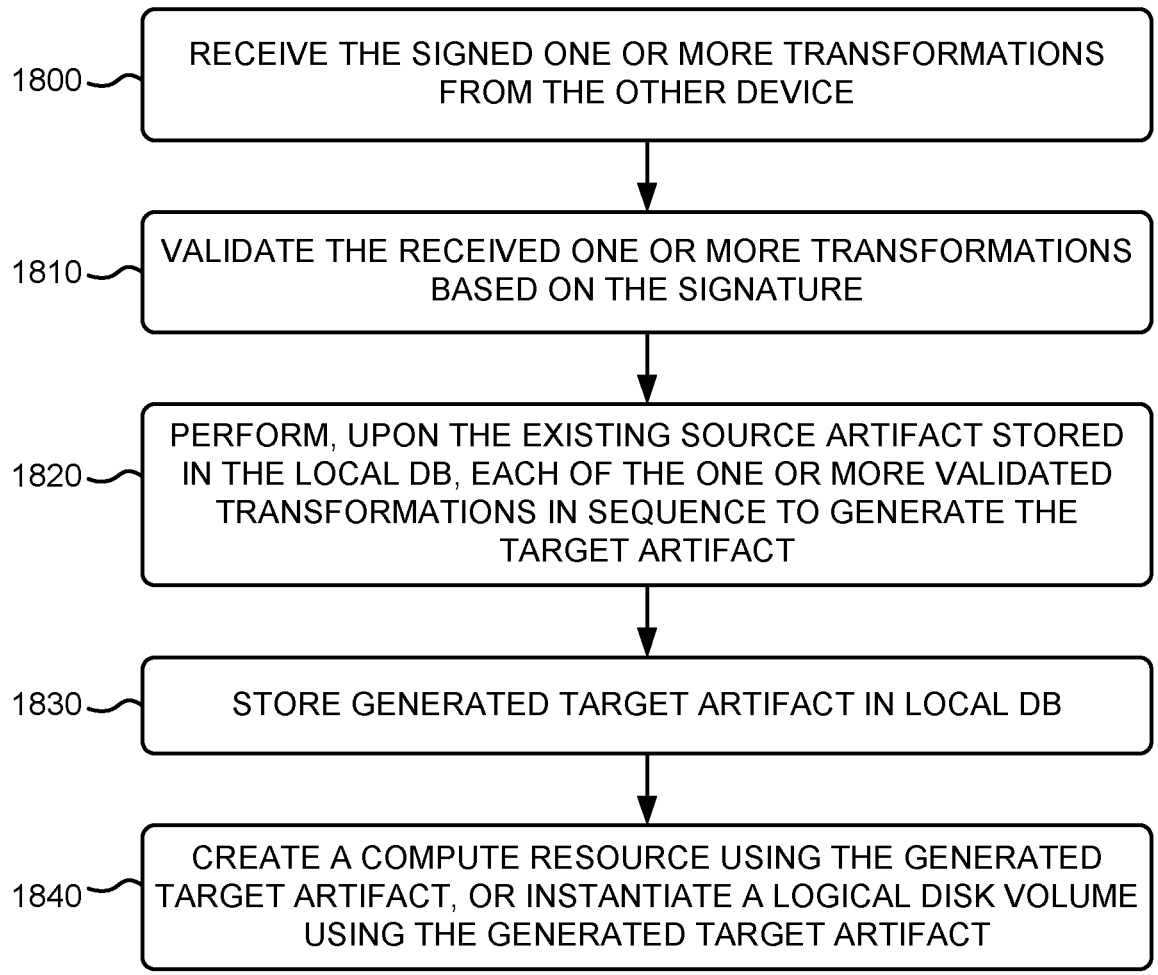
FIG. 18 is a flow diagram of an exemplary process for receiving a transformation(s) from another device, and performing the transformation(s) upon an existing source artifact to obtain a target artifact.

FIG. 18 is a flow diagram of an exemplary process for receiving a transformation(s) from another device and performing the transformation(s) upon an existing source artifact to obtain a target artifact. The process of FIG. 18 may be executed by, for example, end user device 215, artifact management device 205, or edge device 225. For example, end user device 215 may receive one or more signed transformations from edge device 225 or artifact management device 205. As another example, edge device 225 may receive one or more signed transformations from artifact management device 205. The exemplary process of FIG. 18 is described below with reference to the messaging/operations diagrams of FIG. 19, and the exemplary directed acyclic graph 1200 of FIG. 12. In the messaging/operations diagram of FIG. 19, the depicted device 1900 may include end user device 215, or edge device 225, and DB 1905 may include DB(s) 220, or DB 230. The exemplary process of FIG. 18 may be repeated at a device at each receipt of a cryptographically signed transformation(s) from another device (e.g., from edge device 225 or artifact management device 205).

Figure 19:
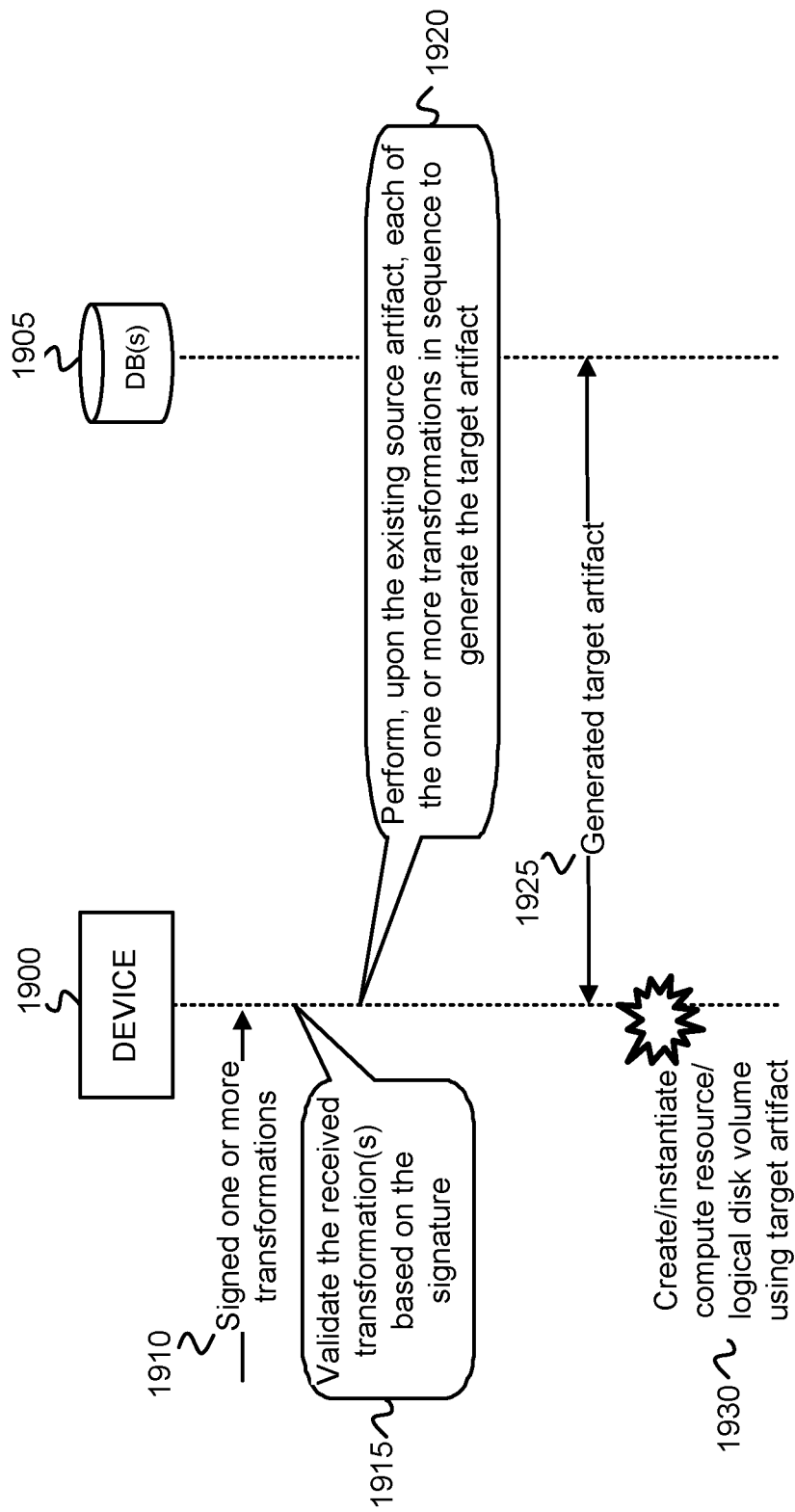
FIG. 19 is a messaging/operations diagram associated with the exemplary process of FIG. 18.

The exemplary process includes a device receiving the signed one or more transformations from the other device (block 1800). In one example, end user device 215 may receive the signed one or more transformations from edge device 225 or artifact management device 205. In another example, edge device 225 may receive the signed one or more transformations from artifact management device 205. FIG. 19 depicts device 1900 receiving a message 1910 that includes the signed one or more transformations.

The device validates the received one or more transformations based on the signature (block 1810). Upon receipt of the signed one or more transformations, the device may use a previously distributed public key, corresponding to the other device that sent the one or more transformations to the device, to validate the signed one or more transformations. If the validation fails, then the device may discard the received one or more transformations, and skip blocks 1820-1840 to end the process of FIG. 18. FIG. 19 depicts device 1900 validating 1915 the received transformation(s) based on the received signature.

The device performs, upon the existing source artifact stored in the local DB, each of the one or more validated transformations in sequence to generate the target artifact (block 1820) and stores the generated target artifact in the local DB (block 1830). Subsequent to successful validation, the device may perform each of the received one or more transformations in the sequence originally identified in the directed acyclic graph (i.e., of block 1610 of FIG. 16). For example, in the specific example graph 1200 of FIG. 12, the transformation represented by edge e1 1210-1 is performed first upon the locally stored artifact, the transformation represented by edge e2 1210-2 is performed second upon the results of the first transformation, and the transformation represented by edge e3 1210-3 is performed third upon the results of the second transformation. FIG. 19 depicts device 1900 performing 1920, upon the existing source artifact, each of the validated one or more transformations in sequence to generate the target artifact. FIG. 19 further shows device 1900 storing 1925 the generated target artifact in DB(s) 1905.

The device creates a compute resource using the generated target artifact or instantiates a logical disk volume using the generated target artifact (block 1840). For example, the device may create a VM, a baremetal, or a container using a generated target image. As another example, the device may instantiate a logical disk volume using a generated target snapshot. FIG. 19 depicts the device 1900 creating/instantiating 1930 the compute resource or logical disk volume using the generated target artifact.

Figure 20:
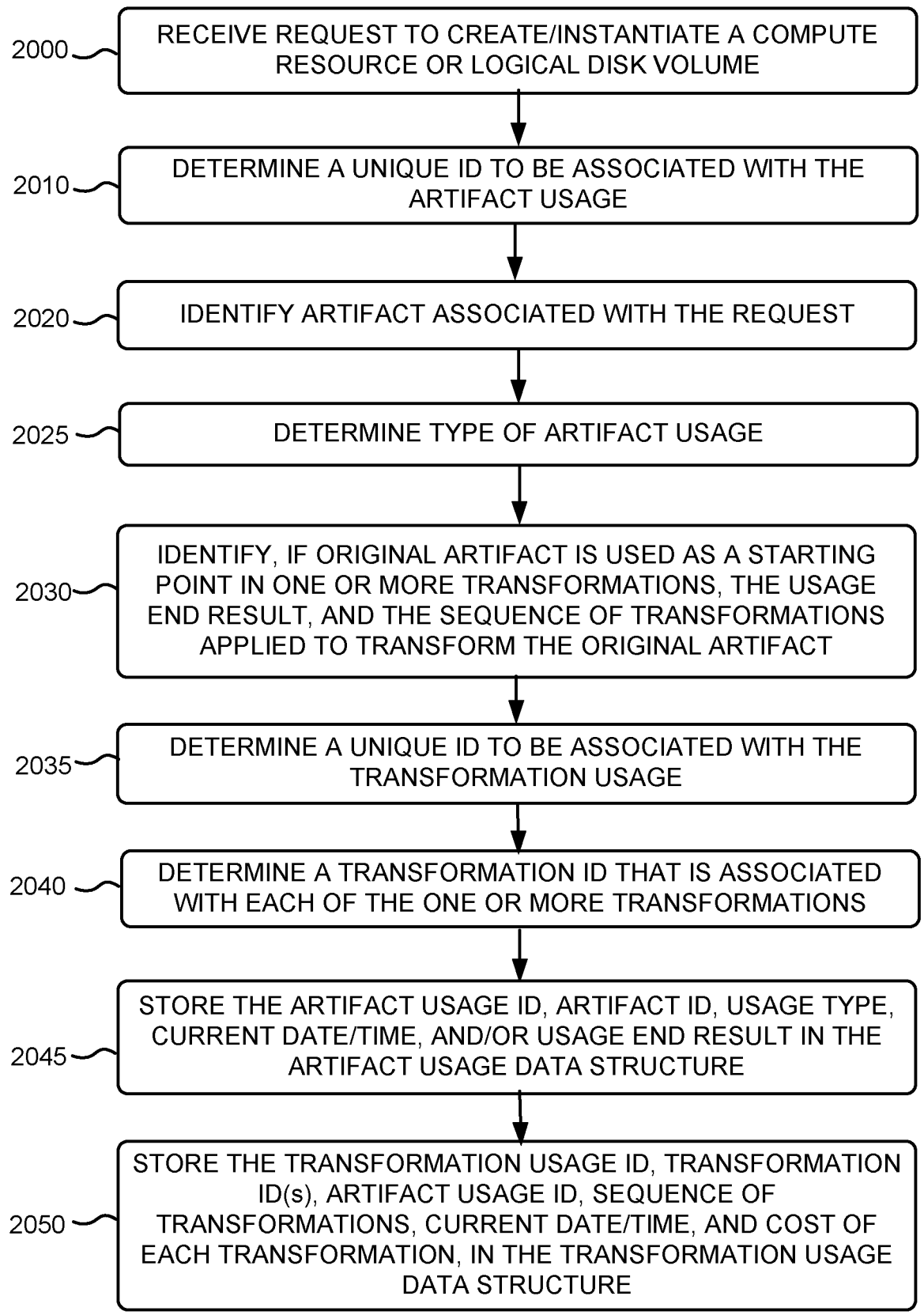
FIG. 20 is a flow diagram of an exemplary process for recording artifact and/or transformation usage information.

FIG. 20 is a flow diagram of an exemplary process for recording artifact and/or transformation usage information. The process of FIG. 20 may be executed by, for example, end user device 215, artifact management device 205, or edge device 225 upon the receipt of, or generation of, a request to create a compute resource. The exemplary process of FIG. 20 may be repeated at a device upon each creation or instantiation of a compute resource or logical disk volume using an artifact.

The exemplary process includes a device receiving a request to create/instantiate a compute resource or logical disk volume (block 2000). For example, an end user device 215 may receive a user request to create or instantiate a particular compute resource or logical disk volume. As another example, an edge device 225 may receive, from an end user device 215, a request to create or instantiate a particular compute resource or logical disk volume. As a further example, artifact management device 205 may receive, from an end user device 215 or an edge device 225, a request to create or instantiate the particular compute resource or logical disk volume.

The device determines a unique ID to be associated with the artifact usage (block 2010). The unique ID for the particular artifact usage, associated with the invocation or request of the artifact (associated with the request of block 2000), may be assigned as a sequential number, or determined using some type of ID generation algorithm.

The device identifies an artifact associated with the request (block 2020). In the case of a request to create a VM, a baremetal, or a container, a particular image may be associated with the requested VM, baremetal, or container. In the case of a request to instantiate a logical disk volume, a particular snapshot may be associated with the requested logical disk volume.

The device determines a type of artifact usage (block 2025) In one implementation, two different artifact usage types may be associated with the request of block 2000, including a direct usage type and an indirect usage type. The direct usage type indicates that the artifact identified in block 2020 is stored locally, and may be directly retrieved, without having to obtain the artifact through the use of one or more transformations. The indirect usage type indicates that the artifact identified in block 1020 is not stored locally, but may be obtained indirectly through the use of one or more transformations. The device identifies, if the original artifact is used as a starting point in one or more transformations (e.g., an indirect artifact usage type), the usage end result, and the sequence of transformations applied to transform the original artifact (block 2030). For example, a source artifact (artifact_1) may be transformed to a target artifact (artifact_2), using a sequence of transformations, in the order transformation_1, transformation_2, and transformation_N, where N is any integer greater than or equal to one. In this example, the usage end result includes an ID of the target artifact (artifact_2) generated by the sequence of transformations.

The device determines a unique ID to be associated with the transformation usage (block 2035). The unique ID for the particular transformation usage, associated with block 2030, may be assigned as a sequential number, or determined using some type of ID generation algorithm. The device determines a transformation ID that is associated with each of the one or more transformations in the sequence of transformations applied to transform the original artifact to the target artifact (block 2040). Each of the one or more transformations may have a pre-determined transformation ID that is used to identify the transformation (e.g., such as stored in field 520 of data structure 500).

The device stores the artifact usage ID, artifact ID, usage type, current date/time, and/or usage end result in the artifact usage data structure 600 (block 2045). If the usage type includes one or more transformations, then the usage end result may include the target artifact. For example, the device stores, in an entry 610 of artifact usage data structure 600, the artifact usage ID in field 620, the artifact ID in field 630, the usage type in field 640, the current date and/or time in field 650, and the usage end result in field 660.

The device stores the transformation usage ID, transformation ID, artifact usage ID, sequence of transformations, current date/time, and/or cost of each transformation in the transformation usage data structure 700 (block 2050). During the transformation of the artifact, the device may record the cost of the transformation, where the cost includes some measure of the time or resources required to perform the sequence of transformations. For example, the device stores, in an entry 710 of transformation usage data structure 700, the transformation usage ID in field 720, the transformation ID(s) in field 730, the artifact usage ID in field 740, the sequence of transformations in field 750, the current date and/or time in field 760, and the transformation cost(s) in field 770.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 8, 10A-10B, 13A-13B, 15, 16, 18 and 20, and operation/message flows with respect to FIGS. 9, 11, 14, 17, and 19, the order of the blocks and/or operation/message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving a request for a second artifact, wherein the request identifies a first artifact that is different than the second artifact;
   obtaining a plurality of transformations for transforming the first artifact into the second artifact, wherein each transformation is associated with a data unit associated with transforming the first artifact into the second artifact;
   determining at least one transformation, of the plurality of transformations, wherein the at least one transformation is associated with a smallest data unit of the data units;
   using the determined at least one transformation to transform the first artifact into the second artifact; and
   launching or instantiating a compute resource or a logical disk volume using the second artifact.

2. The method of claim 1, wherein the compute resource comprises one of a virtual machine (VM), a baremetal, or a container and wherein the first artifact and the second artifact each comprise an image or a snapshot.

3. The method of claim 1, wherein the first artifact and the second artifact each comprise a serialized template for creating or instantiating the compute resource.

4. The method of claim 3, wherein the compute resource comprises a virtual machine (VM), and wherein the second artifact comprises the serialized template that represents an operating system (OS), data files, and applications of the VM.

5. The method of claim 1, wherein obtaining the plurality of transformations comprises:
   searching a database (DB) of directed acyclic graphs to identify a first directed acyclic graph that includes a first node corresponding to the first artifact, and a second node corresponding to the second artifact, and at least one graph edge connecting the first node to the second; and
   identifying the at least one transformation based on the at least one graph edge of the identified first directed acyclic graph.

6. The method of claim 1, wherein the smallest data unit specifies a binary difference between the first artifact and the second artifact.

7. The method of claim 1, wherein the at least one transformation comprises multiple transformations.

8. The method of claim 7, wherein the multiple transformations comprise a first data unit and a second data unit, wherein the first data unit specifies a first binary difference between the first artifact and an intermediate artifact, and wherein the second data unit specifies a second binary difference between the intermediate artifact and the second artifact.

9. The method of claim 7, wherein using the determined at least one transformation comprises:
   using the multiple transformations, in a sequence, to transform the first artifact into the second artifact.

10. The method of claim 1, wherein obtaining the plurality of transformations comprises:
    searching a database (DB) of directed acyclic graphs to identify a first directed acyclic graph that includes a first node corresponding to the first artifact, a second node corresponding to an intermediate artifact, a third node corresponding to the second artifact, a first graph edge connecting the first node and the second node, and a second graph edge connecting the second node and the third node; and
    wherein determining the at least one transformation comprises:
    identifying the at least one transformation based on the first graph edge and the second graph edge of the identified first directed acyclic graph.

11. A network device, comprising:
    a communication interface connected to a network; and
    a processing unit configured to:
    receive a request for a second artifact, wherein the request identifies a first artifact that is different than the second artifact,
    obtain a plurality of transformation for transforming the first artifact into the second artifact, wherein each transformation is associated with a data unit associated with transforming the first artifact into the second artifact,
    determine at least one transformation, of the plurality of transformations, wherein the at least one transformation is associated with a smallest data unit of the data units,
    use the determined at least one transformation to transform the first artifact into the second artifact, and
    launch or instantiate a compute resource or a logical disk volume using the second artifact.

12. The network device of claim 11, wherein the compute resource comprises one of a virtual machine (VM), a baremetal, or a container and wherein the first artifact and the second artifact each comprise an image or a snapshot.

13. The network device of claim 11, wherein the first artifact and the second artifact each comprise a serialized template for creating or instantiating the compute resource.

14. The network device of claim 13, wherein the compute resource comprises a virtual machine (VM), and wherein the second artifact comprises the serialized template that represents an operating system (OS), data files, and applications of the VM.

15. The network device of claim 11, wherein, when obtaining the plurality of transformations, the processing unit is further configured to:
    search a database (DB) of directed acyclic graphs to identify a first directed acyclic graph that includes a first node corresponding to the first artifact, and a second node corresponding to the second artifact, and at least one graph edge connecting the first node to the second, and wherein, when determining the at least one transformation, the processing unit is further configured to:
identify the at least one transformation based on the at least one graph edge of the identified first directed acyclic graph.

16. The network device of claim 11, wherein the smallest data unit specifies a binary difference between the first artifact and the second artifact.

17. The network device of claim 11, wherein the at least one transformation comprises multiple transformations, and wherein, when using the determined at least one transformation, the processing unit is further configured to:
use the multiple transformations, in a sequence, to transform the first artifact into the second artifact.

18. A non-transitory storage medium storing instructions executable by a network device, wherein the instructions comprise instructions to cause the network device to:
receive a request for a second artifact, wherein the request identifies a first artifact that is different than the second artifact;
obtain a plurality of transformations for transforming the first artifact into the second artifact, wherein each transformation is associated with a data unit associated with transforming the first artifact into the second artifact;
determine at least one transformation, of the plurality of transformations, wherein the at least one transformation is associated with a smallest data unit of the data units;
use the determined at least one transformation to transform the first artifact into the second artifact; and
launch or instantiate a compute resource or a logical disk volume using the second artifact.

19. The non-transitory storage medium of claim 18, wherein the compute resource comprises one of a virtual machine (VM), a baremetal, or a container, and wherein the first artifact and the second artifact each comprise a serialized template for creating or instantiating the compute resource.

20. The non-transitory storage medium of claim 18, wherein the instructions to obtain the plurality of transformations further comprise instructions to cause the network device to:
search a database (DB) of directed acyclic graphs to identify a first directed acyclic graph that includes a first node corresponding to the first artifact, and a second node corresponding to the second artifact, and at least one graph edge connecting the first node to the second; and
wherein the instructions to determine the at least one transformation further comprise instructions to cause the network device to:
identify the at least one transformation based on the at least one graph edge of the identified first directed acyclic graph.

\* \* \* \* \*